(12) United States Patent
Hammerle et al.

(10) Patent No.: US 12,499,243 B1
(45) Date of Patent: Dec. 16, 2025

(54) AUTOMATED THREAT HUNTING

(71) Applicant: Dropzone.ai, Inc., Seattle, WA (US)

(72) Inventors: Eric Joseph Hammerle, Kirkland, WA (US); Xue Jun Wu, Seattle, WA (US); Colin James Phillips, Kirkland, WA (US); Changhwan Oh, Shoreline, WA (US); Robert Rowland Foley, Long Island City, NY (US); Michael Francis Buono, McLean, VA (US)

(73) Assignee: Dropzone.ai, Inc., Seattle, WA (US)

( * ) Notice: Subject to any disclaimer, the term of this patent is extended or adjusted under 35 U.S.C. 154(b) by 0 days.

(21) Appl. No.: 19/296,653

(22) Filed: Aug. 11, 2025

(51) Int. Cl.
*G06F 21/57* (2013.01)
*G06F 21/31* (2013.01)

(52) U.S. Cl.
CPC .......... *G06F 21/577* (2013.01); *G06F 21/316* (2013.01)

(58) Field of Classification Search
CPC .............................. G06F 21/577; G06F 21/316
See application file for complete search history.

(56) References Cited

U.S. PATENT DOCUMENTS

| | | |
|---|---|---|
| 7,330,817 B1 | 2/2008 | Exall et al. |
| 9,600,659 B1 | 3/2017 | Bird et al. |
| 10,198,433 B2 | 2/2019 | Weston et al. |
| 10,666,666 B1 | 5/2020 | Saurabh |
| 10,694,026 B2 | 6/2020 | Chandrasekaran et al. |
| 11,916,767 B1 | 2/2024 | Wu et al. |
| 11,943,387 B1 | 3/2024 | Wolinsky et al. |
| 11,960,515 B1 | 4/2024 | Pallakonda et al. |
| 12,008,332 B1 | 6/2024 | Gardner et al. |
| 12,034,616 B1 | 7/2024 | Wu et al. |
| 12,105,746 B1 | 10/2024 | Wu et al. |
| 12,229,313 B1 | 2/2025 | Shastry et al. |
| 12,248,501 B1 | 3/2025 | Wu et al. |
| 2003/0093276 A1 | 5/2003 | Miller et al. |

(Continued)

FOREIGN PATENT DOCUMENTS

| | | |
|---|---|---|
| CN | 115981240 B | 6/2023 |
| WO | 2025/029346 A1 | 2/2025 |

OTHER PUBLICATIONS

Office Communication for U.S. Appl. No. 18/230,123 mailed Sep. 25, 2023, 9 Pages.

(Continued)

*Primary Examiner* — Baotran N To
(74) *Attorney, Agent, or Firm* — John W. Branch; Branch Partners PLLC

(57) ABSTRACT

Embodiments perform automated threat hunting in computing environments. A threat hunt plan is obtained to guide collection of candidate evidence items from evidence sources. Portions of candidate evidence items are discarded based on relevance scores, and evidence items are determined from non-discarded portions. Threat indicators associated with the evidence items are identified based on criteria in the threat hunt plan. Threat profiles are obtained based on the evidence items and threat indicators such that threat profiles include threat assessment metrics and are included in a report. Collection agents may interface with system logs, network traffic captures, endpoints, databases, email services, or user activity records to gather evidence items based on time ranges, filtering criteria, or sampling rates.

20 Claims, 16 Drawing Sheets

(56) References Cited

U.S. PATENT DOCUMENTS

| | | |
|---|---|---|
| 2013/0343205 A1 | 12/2013 | Dolan et al. |
| 2015/0347569 A1 | 12/2015 | Allen et al. |
| 2016/0171068 A1 | 6/2016 | Hardin |
| 2016/0342317 A1 | 11/2016 | Lim et al. |
| 2018/0240043 A1 | 8/2018 | Majumdar et al. |
| 2019/0138879 A1 | 5/2019 | Hu et al. |
| 2020/0184072 A1 | 6/2020 | Ikeda |
| 2020/0387816 A1 | 12/2020 | Rodriguez Bravo et al. |
| 2021/0174095 A1 | 6/2021 | Kong et al. |
| 2022/0263858 A1* | 8/2022 | Bargnesi ............. H04L 63/0263 |
| 2022/0263860 A1* | 8/2022 | Crabtree ............. H04L 63/1425 |
| 2022/0295008 A1 | 9/2022 | Nold et al. |
| 2022/0391595 A1 | 12/2022 | Shevelev et al. |
| 2023/0208971 A1 | 6/2023 | Te Booij et al. |
| 2023/0244869 A1 | 8/2023 | Neumann |
| 2023/0359789 A1 | 11/2023 | Andre et al. |
| 2024/0045990 A1 | 2/2024 | Boyer et al. |
| 2024/0054233 A1 | 2/2024 | Ohayon et al. |
| 2024/0070251 A1 | 2/2024 | Maizels et al. |
| 2024/0098105 A1* | 3/2024 | Kanady ............... H04L 63/1416 |
| 2024/0134865 A1 | 4/2024 | Bierner et al. |
| 2024/0260892 A1 | 8/2024 | Haas et al. |
| 2024/0281472 A1 | 8/2024 | Larhette et al. |
| 2024/0291779 A1 | 8/2024 | Catalano et al. |
| 2024/0291853 A1 | 8/2024 | Murphy et al. |
| 2024/0323152 A1 | 9/2024 | Rosenberg et al. |
| 2024/0355337 A1 | 10/2024 | Altaf et al. |
| 2024/0363099 A1 | 10/2024 | Altaf et al. |
| 2024/0363103 A1 | 10/2024 | Altaf et al. |
| 2024/0393750 A1 | 11/2024 | Malladi et al. |
| 2024/0402664 A1 | 12/2024 | Sudhakar et al. |
| 2024/0403416 A1 | 12/2024 | Sharpe et al. |
| 2024/0403634 A1 | 12/2024 | Hawes et al. |
| 2024/0411994 A1 | 12/2024 | Siracusano et al. |
| 2024/0412031 A1 | 12/2024 | Rayman |
| 2024/0412839 A1 | 12/2024 | Tang et al. |
| 2024/0414211 A1 | 12/2024 | Boyer et al. |
| 2025/0037107 A1 | 1/2025 | Abdelrahman et al. |
| 2025/0047578 A1 | 2/2025 | Wu et al. |
| 2025/0053273 A1 | 2/2025 | Uva |
| 2025/0209156 A1* | 6/2025 | Sankaran ............ H04L 63/1425 |

OTHER PUBLICATIONS

Office Communication for U.S. Appl. No. 18/230,123 mailed Dec. 12, 2023, 22 Pages.

Office Communication for U.S. Appl. No. 18/587,712 mailed May 14, 2024, 14 Pages.

Office Communication for U.S. Appl. No. 18/652,093 mailed Jul. 31, 2024, 21 Pages.

Office Communication for U.S. Appl. No. 18/753,778 mailed Sep. 5, 2024, 16 Pages.

International Search Report and Written Opinion for International Patent Application No. PCT/US2024/028612 mailed Aug. 6, 2024, 14 Pages.

Sreake Division, "Achieving operational efficiency in Kubernetes with ChatGPT-4: Troubleshooting", Three Shakes Inc., Blog; May 23, 2023, 57 pages.

Fixpoint Inc., "Decision to release fault notification service using LLM", PR Times, Jul. 18, 2023, 4 pages.

Office Communication for U.S. Appl. No. 18/902,566 mailed Dec. 6, 2024, 21 Pages.

Office Communication for U.S. Appl. No. 18/753,778 mailed Dec. 30, 2024, 10 Pages.

Office Communication for U.S. Appl. No. 18/753,778 mailed Mar. 20, 2025, 4 Pages.

Office Communication for U.S. Appl. No. 18/978,990 mailed Mar. 12, 2025, 23 Pages.

Office Communication for U.S. Appl. No. 18/753,778 mailed Apr. 23, 2025, 11 Pages.

Office Communication for U.S. Appl. No. 18/978,990 mailed Jul. 7, 2025, 18 Pages.

Office Communication for U.S. Appl. No. 18/753,778 mailed Sep. 18, 2025, 10 Pages.

Office Communication for U.S. Appl. No. 18/978,990 mailed Sep. 30, 2025, 4 Pages.

Office Communication for U.S. Appl. No. 19/296,689 mailed Oct. 24, 2025, 10 Pages.

* cited by examiner

AUTOMATED THREAT HUNTING

TECHNICAL FIELD

These innovations relate generally to computer associated security, and more particularly, but not exclusively, to automated threat hunting.

BACKGROUND

As organizations become increasingly dependent on heterogenous computer environments that may include complex networks, remote services, distributed services, or the like, managing and monitoring infrastructure access in such computing environments can become both increasingly critically important and increasingly complex. Difficulties associated with managing computing environments may not be new, however, interconnections among remote offices, data centers, remote employees, remote customers, and so on, have resulted in organizations relying more broadly on heterogeneous distributed services, or the like. To help manage their information technology infrastructure, organizations have developed various strategies to protect their technology and infrastructure from direct threats or indirect threats. One common practice is to proactively perform various investigations to identify threats that have not been detected or reported by conventional threat monitoring methods. However, so-called threat hunts often require expert analysts who leverage their advanced skills to conduct broad-based investigations to find threats or potential threats before other threat detection systems. Accordingly, often pro-active threat hunting may be limited to organizations that can afford the added expenses associated with conducting effective threat hunts, such as dedicated staff, enhanced monitoring, or the like. Often, smaller or less mature organizations may be unable to afford the added protections obtained because of proactive threat hunting. Thus, it is with respect to these considerations and others that these present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
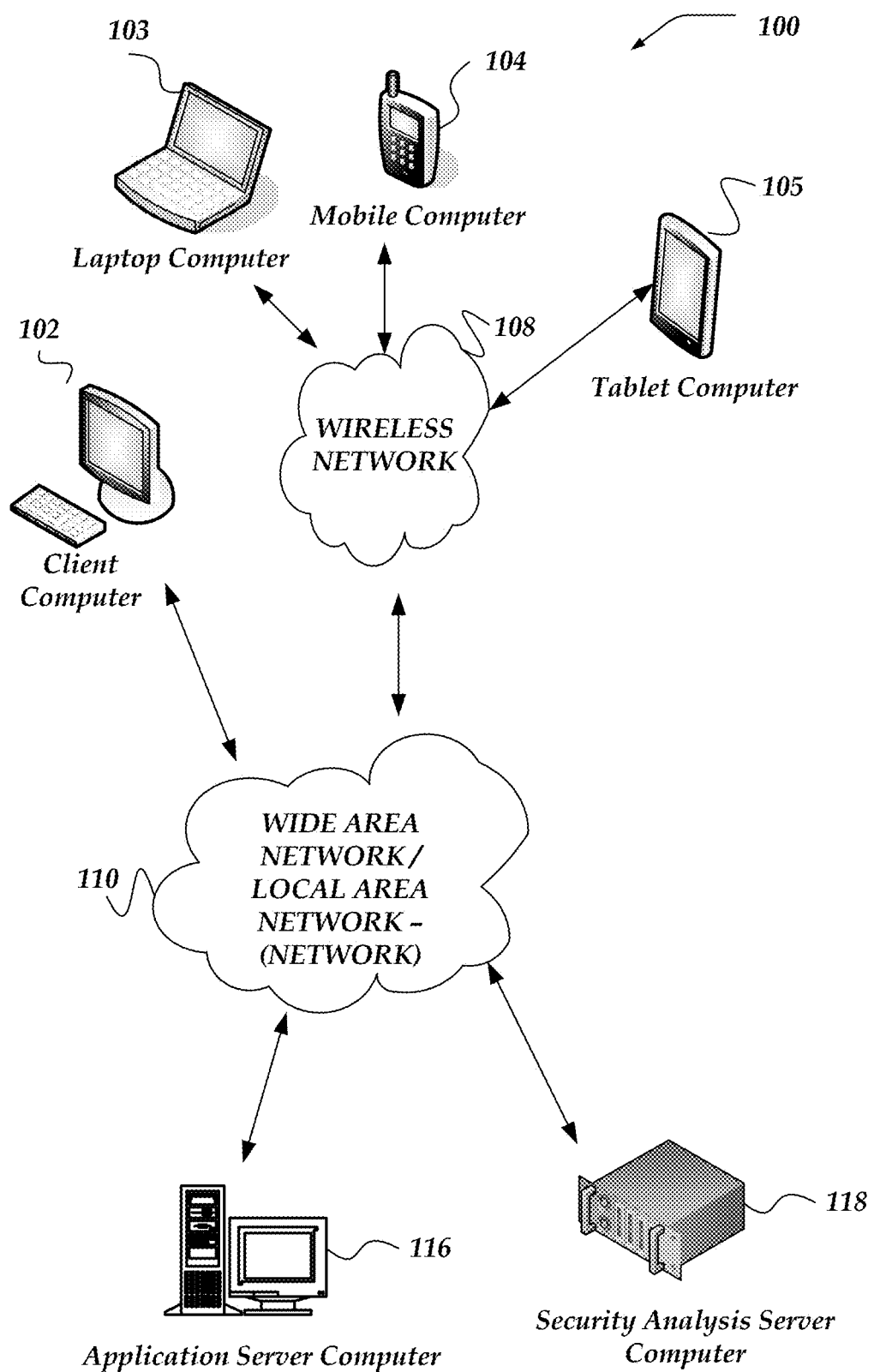
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, *Julia*, JavaScript, Ruby, VBScript, Microsoft.NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or" prompt dataset" refer to one or more data structures that contain or represent prompt information that may be provided to LLMs.

As used herein, the term "event," or "event information" as used herein refer one or more data structures or messages that may report alerts, outcomes, conditions, or occurrences that may be detected or observed in a networked computing environment. Event information may include additional context information associated with an event, such as event source, event type, or the like. Organizations may deploy various systems that may be configured to monitor various types of events depending on needs of an industry or technology area. For example, information technology services may generate events in response to one or more conditions, such as, computers going offline, memory over-utilization, CPU over-utilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof. Events may be provided using one or more messages, emails, telephone calls, library function calls, application programming interface (API) calls, including any signals provided to indicate that an event has occurred. One or more third party and/or external systems may be configured to generate event messages.

As used herein, the term "threat hunting" may be considered to refer to various actions, including proactively searching for one or more potential threats, identifying one or more potential threats, mitigating one or more potential threats, one or more malicious activities, identifying one or more vulnerabilities within a network, or the like before the network is harmed. Threat hunting may combine data gathering, advanced analytics, or the like to uncover hidden threats that may include advanced persistent threats, insider threats, zero-day exploits, or the like with a goal of reducing the risk of cyberattacks and improve overall security posture in a managed network.

As used herein, the term "threat hunt hypothesis" refers to one or more data structures that represent an educated assumption, question, or investigative proposition that guides proactive threat hunting activities. A threat hunt hypothesis may be based on known attack patterns, threat intelligence indicators, observed anomalies, security research, or industry threat reports. Threat hunt hypotheses may include hypothesis statements (e.g., "A VPN account is being used outside of normal business hours or from an unusual geographic location"), rationales for the hypothesis, hunt approaches or strategies, and may be directed to specific threat scenarios such as unauthorized data exfiltration, malicious command and control communication, DNS tunneling, suspicious encrypted traffic, insider threats, or advanced persistent threats. Threat hunt hypotheses may be predefined, user-generated, automatically generated based on environmental conditions, or derived from threat intelligence feeds, and serve as the foundation for selecting appropriate threat hunting plans and evidence collection strategies.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to automated threat hunting in computing environments. In one or more of the various embodiments, a threat hunt plan may be obtained to collect a plurality of candidate evidence items from one or more evidence sources.

In one or more of the various embodiments, one or more portions of the plurality of candidate evidence items may be discarded based on a relevance score associated with each candidate evidence item.

In one or more of the various embodiments, one or more evidence items may be collected based on one or more non-discarded portions of the plurality of candidate evidence items.

In one or more of the various embodiments, one or more threat indicators associated with the one or more evidence items may be identified based on one or more criteria in the threat hunt plan.

In one or more of the various embodiments, one or more threat profiles may be obtained based on the one or more evidence items and the one or more threat indicators such that the one or more threat profiles may include one or more threat assessment metrics associated with the one or more threat indicators and the one or more threat profiles may be included in a report.

In one or more of the various embodiments, a user interface that includes one or more display panels for content that includes the report and other information associated with the one or more threat assessments may be obtained such that the content may be dynamically transformed and arranged for display to a user based on one or more of user interaction telemetry, user feedback, or telemetry metrics.

In one or more of the various embodiments, threat intelligence data may be collected from one or more external threat sources including one or more of a security vendor advisory, a government alert, an industry threat report, or a vulnerability disclosure.

In one or more of the various embodiments, one or more collection agents may be obtained to interface with one or more of a system log, a network traffic capture, an endpoint, a database, an email service, or a user activity record such that the one or more collection agents may collect the plurality of candidate evidence items from the one or more evidence sources based on one or more of a time range, a filtering criterion, or a sampling rate.

In one or more of the various embodiments, the threat hunt plan may be obtained from a threat hunt plan repository based on a threat hunt hypothesis such that the threat hunt plan may include one or more of an evidence collection strategy, an investigation methodology, an analysis framework, or a reporting requirement. In some embodiments, the threat hunt plan may be modified based on one or more of an organizational environment, an available evidence source, a security configuration, or a network architecture.

In one or more of the various embodiments, one or more other portions of candidate evidence items of the plurality of candidate evidence items may be discarded based on one or more filters that include one or more of a relevance filter, a quality filter, a format validator, or a duplicate detector. In some embodiments, one or more of a data format, a timestamp format, an entity identifier, or a metadata structure associated with each non-discarded candidate evidence item may be normalized.

In one or more of the various embodiments, one or more authentication actions associated with the one or more evidence items may be obtained such that the one or more authentication actions may include one or more of a login frequency, an access timing pattern, a credential usage pattern, or a session management activity. In some embodiments, the one or more authentication actions may be correlated with one or more of a user role, a geographic location, a device characteristic, or a network context to identify one or more security concerns such that the one or more security concerns may be included in the threat profile.

In one or more of the various embodiments, one or more metrics that include one or more of a threat severity rating, a confidence score, a risk indicator, or an evidence correlation that are associated with the one or more evidence items may be obtained such that the one or more threat profiles may include the one or more metrics.

In one or more of the various embodiments, one or more threats may be detected such that one or more descriptions of the one or more detected threats may include one or more of evidence documentation, an attack vector description, a compromise indicator summary, or a threat actor attribution analysis. In some embodiments, one or more response recommendations associated with the one or more threats including one or more of an immediate containment measure, a threat mitigation strategy, a system hardening procedure, or an incident response escalation protocol may be obtained such that the report may be updated to include the one or more descriptions and the one or more response recommendations.

In one or more of the various embodiments, one or more other response recommendations including one or more of a complementary threat hunting plan, an expanded evidence collection activity, a related threat vector analysis, or a continuous monitoring requirement may be obtained. In some embodiments, one or more detection rule proposals that incorporate one or more of a discovered threat indicator, an attack pattern, a behavioral anomaly, or a compromise signature into one or more automated monitoring systems may be collected such that the report may be updated to include the one or more other response recommendations and the one or more detection rule proposals.

In one or more of the various embodiments, a threat hunt hypothesis may be obtained based on one or more of a user input, a scheduled task, or a notice associated with one or more potential security threats such that the threat hunt plan may be based on the threat hunt hypothesis, or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, security analysis server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, security analysis server computer 118, or other computers.

Client computers 102-105 may further be configured to include a client application that enables an end-user to log into an end-user account that may be managed by another computer, such as application server computer 116, security analysis server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to security analysis server computer 118. Also, client computers may be arranged to enable users to display reports, interactive user-interfaces, results provided by security analysis server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, security analysis server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and security analysis server computer 118 are described in more detail below in conjunction with FIG. 3. Although FIG. 1 illustrates application server computer 116, or security analysis server computer 118 each as a single computer, the innovations or embodiments are not so limited. For example, one or more functions of application server computer 116, or security analysis server computer 118, or the like, may be distributed across one or more distinct network computers. Moreover, in one or more embodiments, security analysis server computer 118 may be implemented using a plurality of network computers. Further, in one or more of the various embodiments, application server computer 116, or security analysis server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
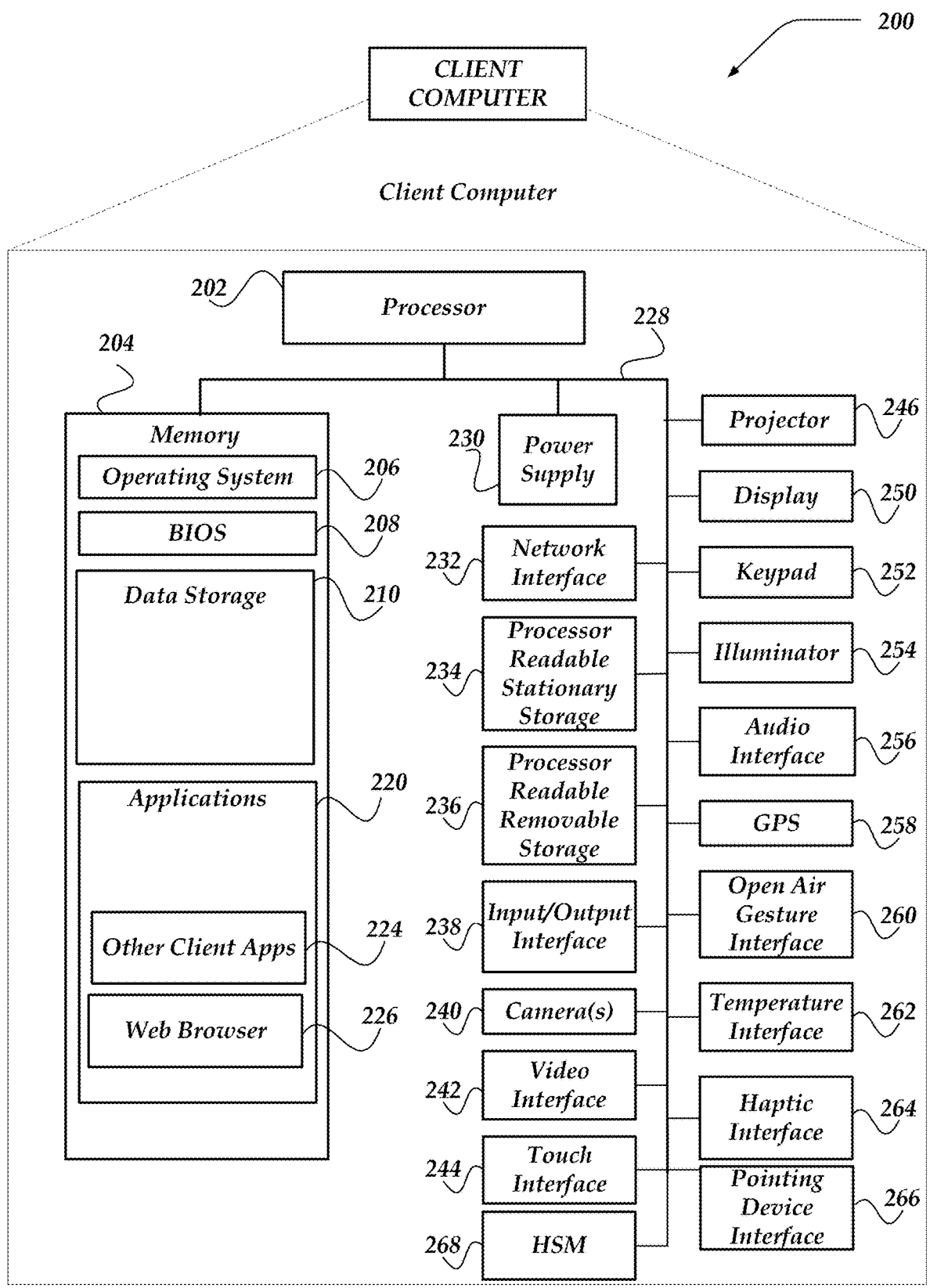
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen. Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
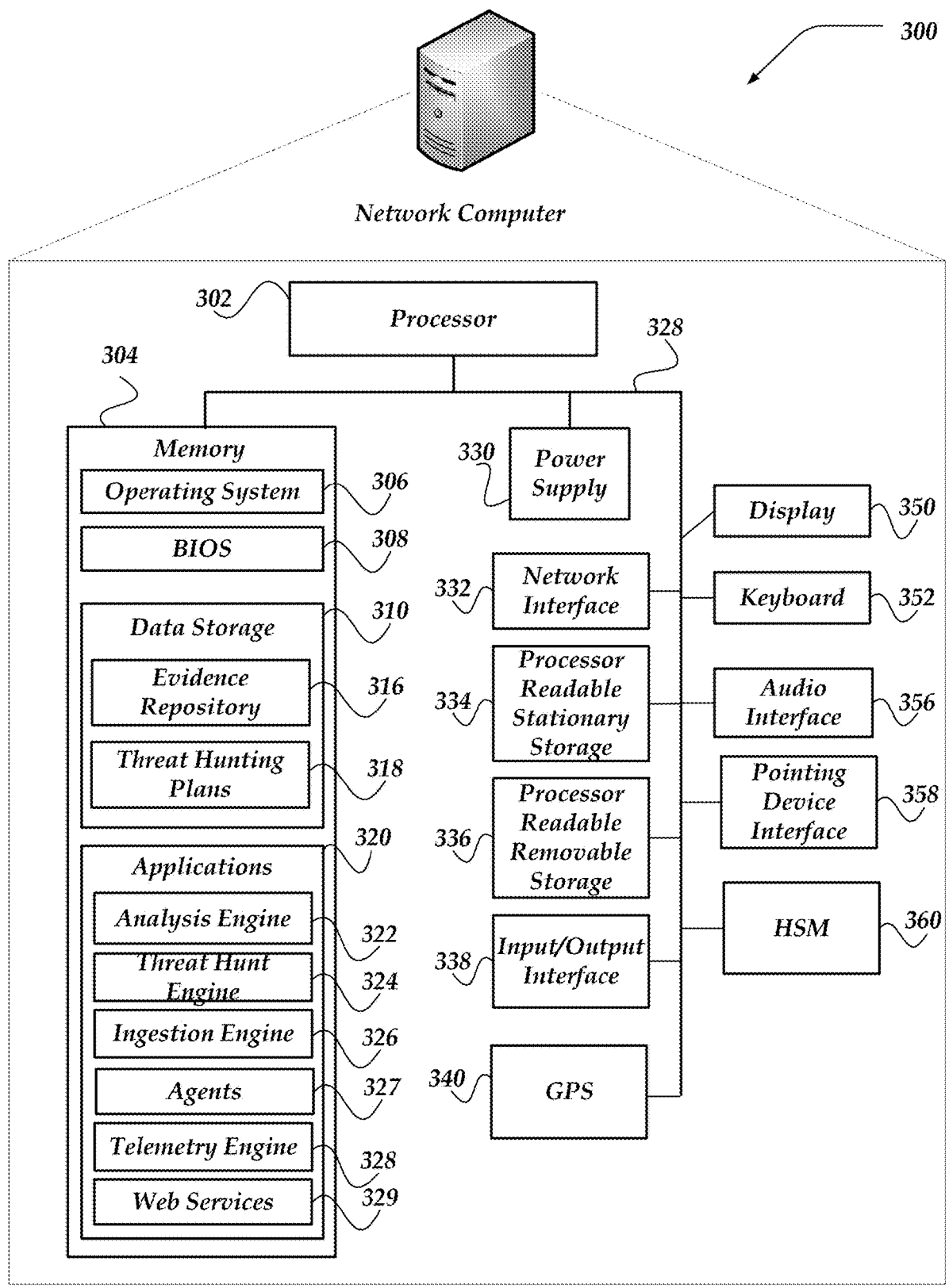
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, security analysis server computer 118 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured for automated threat hunting in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, analysis engine 322, threat hunting engine 324, ingestion engine 326, agents 327, telemetry engine 328, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, (threat hunting) evidence repository 316, threat hunting plans 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include analysis engine 322, threat hunting engine 324, ingestion engine 326, agents 327, telemetry engine 328, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, threat hunting engine 324, ingestion engine 326, agents 327, telemetry engine 328, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to analysis engine 322, threat hunting engine 324, ingestion engine 326, agents 327, telemetry engine 328, web services 329, or the like, may be provisioned and de-commissioned automatically.

Also, in one or more of the various embodiments, analysis engine 322, threat hunting engine 324, ingestion engine 326, agents 327, telemetry engine 328, web services 329, or the like, may be located in virtual servers running in a cloud-based computing environment rather than being tied to one or more specific physical network computers. Likewise, in some embodiments, one or more of analysis engine 322, threat hunting engine 324, ingestion engine 326, agents 327, telemetry engine 328, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
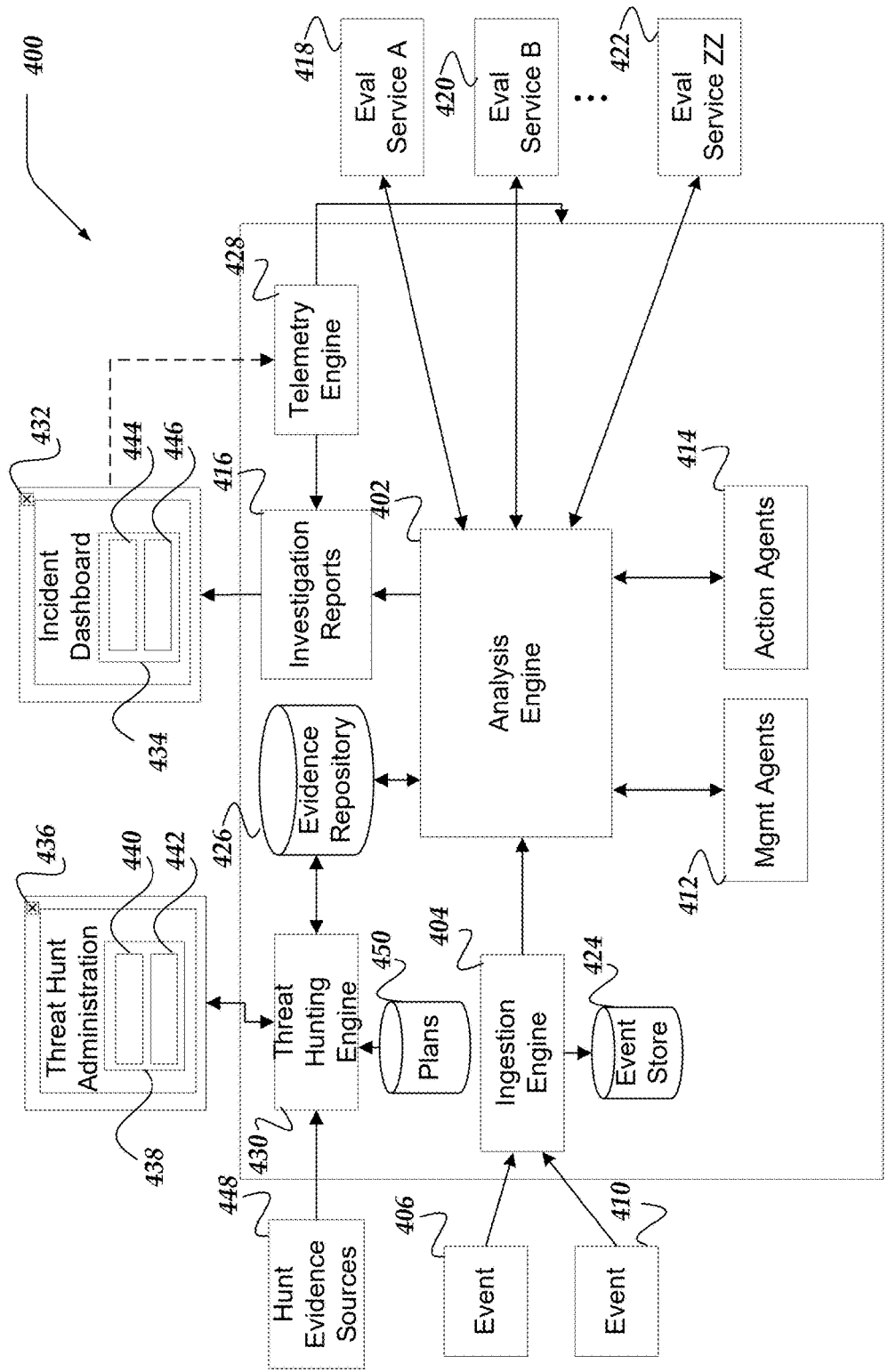
FIG. 4 illustrates a logical architecture of a system for automated threat hunting in accordance with one or more of the various embodiments.

FIG. 4 illustrates a logical architecture of system 400 for automated threat hunting in accordance with one or more of the various embodiments.

In one or more of the various embodiments, analysis engines, such as analysis engine 402 may be provided one or more events, such as event 406, event 410, or the like, via an ingestion engine, such as, ingestion engine 404. Accordingly, in some embodiments, as event information may be ingested, analysis engines may be arranged to employ one or more agents, such as, management agents 412, action agents 414, or the like, to evaluate or investigate the events to determine if the events may be events that may be worthy of taking notice. Thus, in some embodiments, analysis engines may be arranged to generate one or more reports, such as, investigation reports 416 that may include information about the one or more events based on the evaluation.

In one or more of the various embodiments, agents, including management agents 412 or action agents 414 may be arranged to communicate with one or more internal or external services that may contribute to the evaluation of events. In this example, for some embodiments, service 418, service 420, or service 422 may be considered to represent one or more internal or external (e.g., third-party SaaS) evaluation services.

In one or more of the various embodiments, organizations may conventionally deploy computing environments that may include various services, applications, devices, systems, or the like, that may monitor various features or metrics associated with their computing infrastructure. In some cases, multiple applications or services may be configured to generate event information, such as log entries, event notifications, alarms, alerts, or the like, that may be relevant to the particular applications or services. Also, in some embodiments, organizations may employ one or more dedicated monitoring tools that may be configured to generate event information associated with various conditions or activity that may occur in the monitored environments. Further, in some embodiments, organizations may deploy one or more network devices that monitor network activity, enforce access policies, balance workloads, or the like. Also, in some embodiments, many organizations may include one or more customized monitoring or alerting systems that may be directed to generating event information associated with their particular operating environments. In general, in some embodiments, organizations may configure their networking environments or computing environments to automatically generate an arbitrary number of events or event information depending on their local requirements or local circumstances. Note, herein computing environments may be alternatively described using terms such as networked environments, monitored networks, or the like. For brevity and clarity these terms may be considered to be computing environments and are not restricted to networks, networked environments, or the like. Also, in some cases, the innovations disclosed herein may be practiced using a single computer or computing device.

In some cases, organizations may be faced with interpreting or processing many events or different event types generated by various sources within or associated with their computing/networking environments. Accordingly, in some cases, administrators may be overwhelmed by the sheer number of events coming from these many sources. Also, in some embodiments, commonly some (or many) events may be considered false positives in that they may be safely ignored or they may be incorrectly reporting a safe signal or safe condition as being unsafe.

Further, in some cases, modern computing environments may often be dynamic with computers (e.g., virtual computers, container-based services, personal computing devices) joining or leaving the networks. Similarly, in some embodiments, networks for some organizations may dynamically be adding physical devices, services, applications, or the like, depending on local circumstances or local requirements.

Accordingly, conventionally, in some cases, organizations may be required to manually determine which events may be considered actionable. In this case, manual determination may include the creation or deployment of filters, classifiers, or the like, that are directed to particular known false positive events. However, in some cases, administrators for organizations may be required to validate/verify many events to determine which events may be false positives. Further, in some cases, such classification may require administrators to perform a wide-variety of ad-hoc operations to track down the source of the event or the source of the circumstances or conditions that may have triggered the event in the first place.

Conventionally, in some cases, administrators may be required to manually employ different internal services or external services that may help classify incoming events. Further, in some cases, different administrators may approach event classification differently from one another such that different administrators may perform different actions or perform actions in an order of operation different from other administrators. Accordingly, in some cases, the veracity or quality of event classification may vary depending on personal preferences or individual biases rather than objective criteria or operations.

Accordingly, in some embodiments, events, such as, event 406 or event 410 may be provided to an ingestion engine, such as ingestion engine 404. In some embodiments, ingestion engines may be arranged to import event information from various sources, such as application/system health monitoring services, network security monitoring services, application log files, event aggregators, or the like. Accordingly, in some embodiments, ingestion engines may be arranged to employ one or more filters, parsers, transformers, interfaces, libraries, or the like, that may be directed to particular event sources. In some embodiments, ingestion engines may be arranged to associate one or more ingestion protocols or ingestion tools with particular event sources. For example, in some embodiments, an event aggregation application may publish an API that ingestion engines may employ to collect events. Likewise, for example, ingestion engines may be arranged to employ a custom log file parser that is directed to a customized event logging system. Accordingly, in some embodiments, ingestion engines may be arranged to employ instructions, filters, parsers, transformers, interfaces, libraries, or the like, provided or determined via configuration information for ingesting events. Thus, in some embodiments, ingestion engines may be arranged to be adaptable to local requirements or local circumstances that may change over time.

In one or more of the various embodiments, ingestion engine 404 may be arranged to store event information in a data store, such as event store 424. Accordingly, in some embodiments, analysis engines may be provided a historical record of some or all events or event information that have been ingested by ingestion engines.

In one or more of the various embodiments, analysis engine 402 may be arranged to evaluate some or all events to determine if some events may be ignored or otherwise automatically resolved while other events may be determined to require human intervention or otherwise be escalated. One of ordinary skill in the art will appreciate that classifying events may include categorizing events into two or more categories depending on local requirements or local circumstances. Accordingly, for brevity and clarity, analysis engines are described in terms of classifying events as false positive events or positive events, however, innovations disclosed herein are not so limited and analysis engines may be arranged to classify events using classification schemes that go beyond binary classification.

Also, in some embodiments, analysis engines may be arranged to associate, determine, or collect various scores, such as severity scores, priority scores, risk-scores, or the like for events. In some cases, analysis engines may be arranged to generate prompts or enhance prompts that may be used by one or more agents for conducting some or all of the analysis operations.

In some embodiments, analysis engines may be arranged to employ one or more management agents, such as, management agents 412 to begin or manage the operations executed to classify events. In some embodiments, management agents may work with one or more action agents, such as action agents 414. In some embodiments, action agents may be arranged to perform one or more particular tasks as part of evaluating events.

In some embodiments, management agents or action agents may be arranged to direct analysis engines to access various internal services or external services to analyze events. In this example, for some embodiments, evaluation service 418, evaluation service 420, or evaluation service 422 may be considered to represent one or more internal services or external services that may be employed to contribute to the analysis of events. For example, in some embodiments, an action agent may direct the analysis engine to use an external service to provide a risk-score for a network address associated with an event. Accordingly, for some embodiments, an action agent may generate instructions that include one or more API calls to internal or external services to provide supplemental evaluation for event classification. Also, in some embodiments, one or more action agents may be arranged to execute APIs of internal services or external services direct from within the agent rather than relying on the analysis engine to execute the API calls.

In one or more of the various embodiments, if one or more events have been classified, analysis engines may be arranged to generate one or more reports, such as investigation reports 416. In some embodiments, investigation reports may be considered machine-readable information that other reporting tools or reporting services may employ to generate reports, visualizations, interactive reports, or the like. Also, in some embodiments, ingestion engines, threat hunting engines, or the like may be arranged to generate one or more user interfaces that enable interactive reports to be presented using data or other information included in investigation reports 416. Further, while it may be advantageous to enable analysis engines to analyze or evaluate events or event information to identify significant events or to recommend one or more mitigation or remediation actions based on an automated analysis of the various events or associated event information, network security may be improved by anticipating threats in the absence of related or associated event information or events. For example, in many cases, events may be directed to activities that are known to be associated with one or more potential threats or security concerns. For example, an event may be generated by an authentication service that reports users that fail authentication. Or, similarly, events may be generated based on assets or resources being accessed or interrogated by unauthorized users or services. However, new or emerging threats may occur or potentially occur such that existing monitoring tools may not be configured to identify the potential threat issue.

Accordingly, in some embodiments, threat hunting engines, such as threat hunting engine 430 may be arranged to enable investigations associated threat hunting.

In this context, threat hunting may be considered to refer to various actions, including proactively searching for one or more potential threats, identifying one or more potential threats, mitigating one or more potential threats, one or more malicious activities, identifying one or more vulnerabilities within a network, or the like before the network is harmed. Threat hunting may combine data gathering, advanced analytics, or the like to uncover hidden threats that may include advanced persistent threats, insider threats, zero-day exploits, or the like with a goal of reducing the risk of cyberattacks and improve overall security posture in a managed network.

In some embodiments, threat hunting engines may be arranged to execute one or more automated threat hunting plans, the results of which may be included in one or more investigation reports. In some embodiments, threat hunting engines may be arranged to collect, filter, or analyze threat evidence collected from various sources, such as hunt evidence sources 448. In some embodiments, hunt evidence sources may include system log files, event archives, file systems, user directories, network traffic (e.g., captured or live network traffic), system performance monitoring metrics, user submissions, security service news feeds, government or industry reports, manufacturer notices, cloud compute vendor security notices, or the like.

In some embodiments, threat hunting plans may include directives to generously collect evidence or potential evidence from a broad set of evidence sources. Accordingly, in some embodiments, evidence or potential evidence may be stored temporarily or persistently in a data store, such as evidence repository 426. In some embodiments, evidence repositories, such as evidence repository 426 may be used to temporarily store working copies of potential evidence as it may be reviewed for relevance. Also, in some embodiments, threat hunting engines may be arranged to archive selected evidence that may be associated with a determined threat or potential threat.

In some embodiments, threat hunting engines, such as threat hunting engine 430 may be arranged to use one or more threat hunting plans, such as threat hunting plan 450 to orchestrate automated threat hunting. In some embodiments, threat hunting plans may be data structures that store or reference instructions, rules, libraries, or the like used for declaring one or more particular threat hunt actions that may be performed during threat hunting. In some embodiments, threat hunt plans may be associated with particular types of threat hunts. Also, in some embodiments, threat hunting plans may be associated with particular types of search targets, search goals, search restrictions, or the like. For example, in some embodiments, particular threat hunting plans may be directed to orchestrating threat hunting in file systems while another threat hunting plan may be directed to reviewing application associated activities, and so on.

In general, one of ordinary skill in the art will appreciate the organizations or their administrators may be enabled to create or configure threat hunting plans that may be directed to arbitrary targets or goals. Further, in some embodiments, threat hunting engines may be arranged to score various threat hunting plans based on various metrics, including age, number of times used, direct user feedback (e.g., scoring), quality of results, or the like.

Further, in some embodiments, systems, such as system 400 may include one or more telemetry engines, such as telemetry engine 428. In some embodiments, telemetry engines may be arranged to monitor or evaluate interactions with applications or user interfaces such as user interface 432, user interface 436, or the like. In some embodiments, this may include monitoring how users or even other applications may interact with user interfaces, interactive reports (e.g., investigation reports), various applications, or one or more system features.

In some embodiments, user interfaces, such as user interface 432 or user interface 436 may include various windows, controls, or other user interface features. In some embodiments, user interfaces may include various user interface panels, such as panel 434, panel 438, or the like. For example, in some embodiments, panel 434, or the like may represent a user interface that enables users, such as security analysts, to review and interact with investigation reports that may be generated by analysis engines for one or more security incidents. Further, in some embodiments, element 440, element 442, element 444, element 446, or the like may be considered to represent various user interface elements, controls, buttons, list items, report features, user interface components, displayed content, formatted content, or the like that may be included in user interfaces.

Also, for example, for some embodiments, user interface 436 may be considered a user interface that enables administrative users to work with manage or conduct threat hunt investigations. For example, panel 438 may be used to select, generate, or modify queries, designate search targets, modify evidence collection plans, review intermediate investigation results, or the like for user interface 436. For example, display panel 438 may be used to display candidate evidence sources sorted based on inferred importance, value, or the like. Likewise, in some embodiments, panels such as panel 438 may be used to display or update evidence filters, status information for pending investigations, candidate evidence, or the like.

Also, in some embodiments, display panel 434 may be employed to display investigation reports or information from investigation reports. In some cases, these may be dashboard-like presentations that display the security activity associated with one or more monitored networks or applications. In some embodiments, panels such as panel 434 may display ordered lists of events, event notifications, recommended resolution actions, or the like that may be associated with security events incident investigations or other activities.

Also, in some embodiments, display panel 434 may be configured to display threats or threat information discovered by automated threat hunting.

In some embodiments, analysis engines, threat hunting engines, telemetry engines, ingestion engines, or the like may be arranged to generate or display user interfaces, such as user interface 432 or user interface 436 to users using one or more of video interface 242, projector 246, display 250, or the like, of a client computer, such as client computer 200. Similarly, in some embodiments, analysis engine 402, threat hunting engine 430, or ingestion engine 404 may be arranged to generate or display user interface 432, user interface 436, or the like to users using a one or more of input/output interface 338, display 350, audio interface 356, or the like, of a network computer, such as network computer 300.

In some embodiments, panel 434 may be arranged to display a rank ordered list of investigation reports or investigation results based on operations performed by analysis engine 402 or threat hunting engine 430. Note, in some embodiments, one of ordinary skill in the art will appreciate that organizations may have significant control or influence over the particular ranking criteria. For example, in some cases, one or more investigation report results may be considered more important than others.

In some embodiments, analysis engines, threat hunting engines, ingestion engines, or the like may be arranged to collect various telemetry or other metrics associated with user interactions with user interfaces. In some embodiments, telemetry may include tracking or monitoring if users may be in agreement with events, threat evidence, threat hunt results, investigation report arrangement/organization, or the like. In some embodiments, analysis engines, threat hunting engines, ingestion engines, or the like may be enabled to employ telemetry information or telemetry metrics collected or determined by telemetry engines, such as telemetry engine 428. In some embodiments, telemetry engines may be separate from analysis engines, threat hunting engines, ingestion engines, or the like as shown here. Also, in some embodiments, telemetry engines may be part of or otherwise embedded in analysis engines, threat hunting engines, ingestion engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, analysis engines, threat hunting engines, ingestion engines, or the like may be arranged to monitor telemetry information associated with one or more users.

Accordingly, in some embodiments, analysis engines, threat hunting engines, ingestion engines, or the like may be arranged to provide one or more user interface facilities to collect direct feedback from one or more of the users that may interact with information displayed in the one or more user interfaces. For example, in some embodiments, user interfaces may include controls that enable authorized users to perform various actions, including grading one or more investigation reports, recommending changes to threat hunting plans, view threat evidence, or the like.

In some embodiments, grades or scores may be binary (e.g., like/dislike), discrete (e.g., one-four stars, letter grades), continuous values, or the like.

Also, in one or more of the various embodiments, analysis engines, threat hunting engines, ingestion engines, or the like may be arranged to provide user interfaces that monitor how users interact with input information, events, investigation reports, recommended resolution actions, threat hunt reports, threat hunt planning, or the like. In some embodiments, telemetry information employed to monitor user preferences may be based on monitoring user interactions as well as direct feedback. Accordingly, in some embodiments, input information, events, investigation reports, recommend resolution actions, or the like, that may appear well-formed but are ignored or discarded by users may be inferred to be poorly received. For example, for some embodiments, if the top ranked results or events provided in response to user actions, user queries, or the like, are ignored or lower ranked results are favored by users, it may be inferred that there may be a problem with the data or the display of the data.

Further, in some embodiments, analysis engines, threat hunting engines, ingestion engines, or the like may be arranged to receive telemetry information from other services or applications. Accordingly, in one or more of the various embodiments, analysis engines, threat hunting engines, ingestion engines, or the like may not be required to directly monitor activity associated with the input information, events, investigation reports, recommended resolution actions, or the like. For example, for some embodiments, user interfaces, such as user interface 432 or user interface 436 may be displayed to users via desktop computer applications, mobile applications, web-based applications, or the like. In some embodiments, such applications may collect the telemetry information and provide some or all it to analysis engines, threat hunting engines, ingestion engines, or the like rather than requiring the analysis engines, threat hunting engines, ingestion engines, or the like to include monitoring facilities on user-facing applications.

Accordingly, in some embodiments, analysis engine 402, threat hunting engine 430, ingestion engine 404, or the like may be arranged to collect metrics or telemetry associated with user interactions with user interface 432 or user interface 436 using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, analysis engine 402, threat hunting engine 430, ingestion engine 404, or the like may be arranged to collect metrics or telemetry associated with user interactions with user interface 432, or user interface 436 using a one or more of input/output interface 338, GPS 340, keyboard 352, audio interface 356, pointing device interface 358, or the like, of a network computer, such as network computer 300.

In some embodiments, analysis engines, threat hunting engines, ingestion engines, or the like may be arranged to track mouse movement, eye movement, keystrokes, or the like, to determine how users may interact with information (e.g., input information, events, investigation reports, recommended resolution actions, threat hunt plans, evidence listings, or the like) displayed in user interfaces. Accordingly, in some embodiments, analysis engines, threat hunting engines, ingestion engines, or the like may be arranged to evaluate at least the quality of various investigation recommendations, threat recommendations, report characteristics, or the like based on how users interact with them. For example, if users consistently select or otherwise favor interacting with items or events ranked lower than others, it may indicate that one or more models or components performing the ranking or item selection may be experiencing diminished or diminishing effectiveness. Likewise, in some embodiments, users may reject or ignore event classifications, investigation report results, suggested actions, threat warnings, or the like which may indicate that one or more associated models or systems may be experiencing diminished or diminishing effectiveness.

In some embodiments, analysis engines, threat hunting engines, ingestion engines, or the like may be arranged to associate a performance score with user interfaces used in the system based on the user interaction metrics or telemetry. Accordingly, in some embodiments, if the performance score associated with a user interface or user interface element falls below a defined threshold value, analysis engines, threat hunting engines, ingestion engines, or the like may be arranged to suspend those user interfaces (or portions thereof) from operation. Or, in some embodiments, analysis engines, threat hunting engines, ingestion engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, and the like. The dynamic transformation may include arrangement, re-arrangement, elimination, addition, or adaptation of content and visual elements in user interfaces and display panels based on at least the collected telemetry information.

Additionally, in some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, analysis engines, threat hunting engines, ingestion engines, or the like may dynamically change the visual appearance of the user interfaces to improve the efficiency and effectiveness of the system or its user interfaces for the user. Accordingly, in some embodiments, analysis engines, threat hunting engines, or ingestion engines may be arranged to dynamically select, position, size, shape, remove, hide, inactivate, disable, highlight, or style one or more visual user interface components such as display panels, controls, elements and content based on one or more of user telemetry metrics and user feedback. For example, if user interactions with the user interface are tracked focusing on or navigating to particular user interface views, components or user interface panels, analysis engines, threat hunting engines, or ingestion engines may be arranged to dynamically highlight or size the preferred user interface elements and/or display panels. For example, if users are determined to rarely interact with a display panel such as display panel 434, analysis engines, threat hunting engines, ingestion engines, or the like may be arranged to dynamically reduce the size, diminish the shape, disable its controls, and re-position display panel 434 by displaying a smaller sized greyed out version of display panel 434 below other display panels.

Also, in some embodiments, analysis engines, threat hunting engines, ingestion engines, or the like may be arranged to adapt user interfaces based on the size/type of display, input methods, user status, or the like. For example, in some embodiments, if a user is determined to be operating using a mobile device, one or more user interface elements may be dynamically positioned differently. In some cases, for some embodiments, depending on the display type or display size, one or more user interface elements may be hidden from view.

Accordingly, in some embodiments, analysis engines, threat hunting engines, ingestion engines, or the like may be arranged to tangibly modify user interfaces, display panels, interactive reports, input collection, input selection, input data representation, threat reports, evidence management, or the like, based on the efficient and effective performance of processes and/or activities associated with various types input information, events, threat evidence, threat investigations, or the like as determined by telemetry information, or the like.

Figure 5:
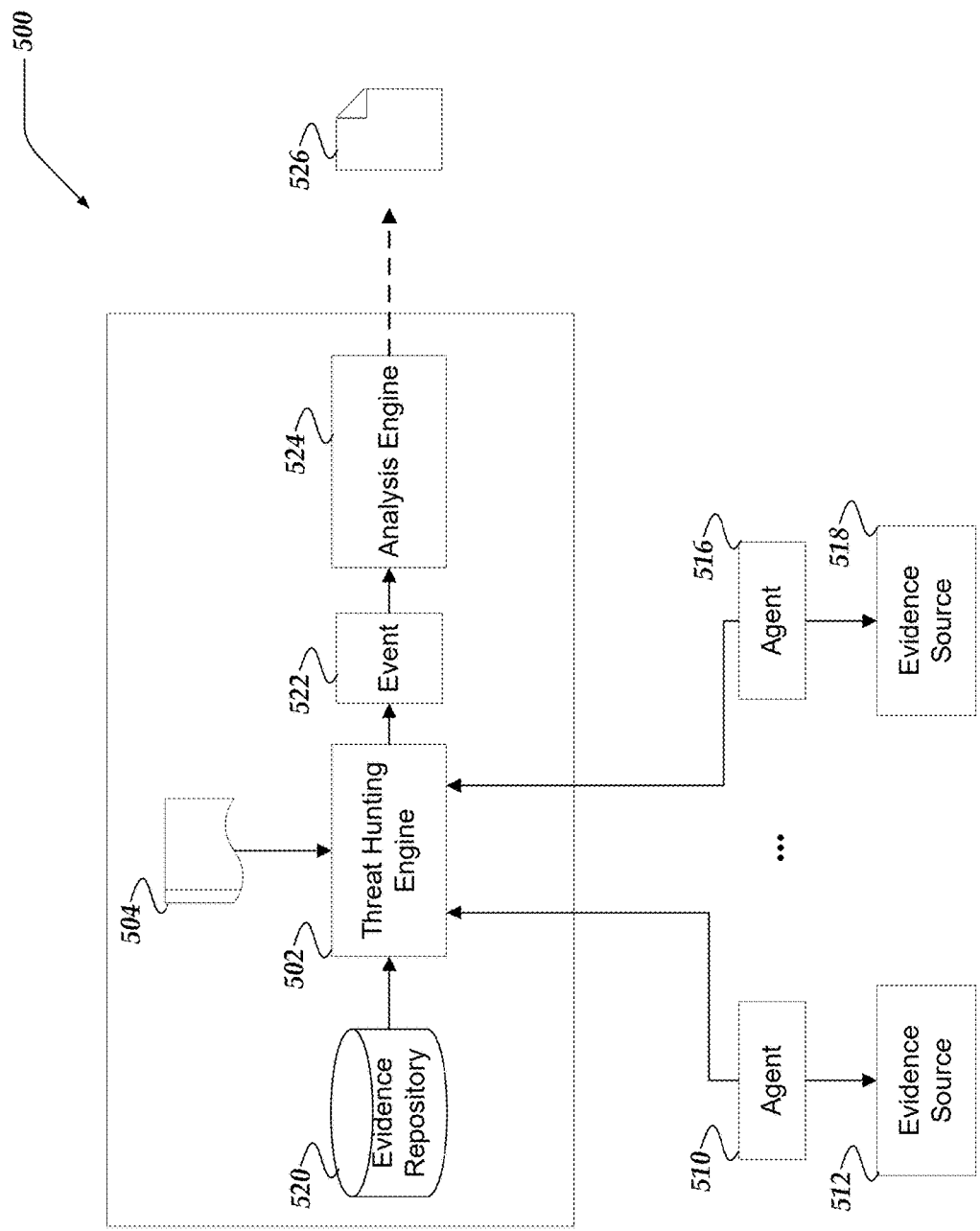
FIG. 5 illustrates a logical schematic of a system for automated threat hunting in accordance with one or more of the various embodiments.

FIG. 5 illustrates a portion of system 500 for automated threat hunting in accordance with one or more of the various embodiments. As introduced above, in some embodiments, network security analysis platforms may be arranged to support automated threat hunting.

Accordingly, in some embodiments, security analysis platforms, such as system 500 may include threat hunting engines, such as threat hunting engine 502 for executing threat hunts.

In some embodiments, threat hunting engines, such as threat hunting engine 502 may obtain one or more threat hunting plans, such as threat hunting plan 504. Briefly, for some embodiments, threat hunting plans may be data structures that include instructions, rules, or the like, for orchestrating threat hunts. In some cases, more than one threat hunting plans may be executed in parallel with others. However, for brevity or clarity, system 500 is illustrated as using one threat hunting plan.

In some embodiments, threat hunting engines may be arranged to interpret the directives declared in threat hunting plans, such as threat hunting plan 504. In some embodiments, one or more portions of a threat hunting plan may include actions directed or delegated to external or alternative services. For example, in some embodiments, a threat hunting plan may include instructions for collecting metrics or other information from a network traffic monitoring service.

In some embodiments, threat hunting plans may include directives for obtaining threat evidence from various sources of evidence. Accordingly, in some embodiments, threat hunting engines may be arranged to generate one or more agents, such as agent 510, agent 516, or the like for gathering evidence from particular sources. In some embodiments, such agents may be considered similar to agents discussed for FIG. 4 but directed to gathering evidence for threat hunting. In some embodiments, agents may be configured to integrate or use generative AI systems to automate strategies for gathering evidence from particular sources. Also, in some embodiments, agents may be assumed to conventional instructions that direct particular actions to be executed for particular evidence source. For example, in some embodiments, an agent may be configured to generate am AI prompt that asks the generative AI to recommend particular APIs or locations that may be suitable for a particular threat hunt such that those recommendations may be mapped to particular operations execute during the threat hunt. Also, for example, for some embodiments, an agent configured to collect threat evidence such as log file entries may execute instructions for locating the files, opening the files, and reading in the number of request log records for subsequent analysis.

In some embodiments, threat hunting plans may be assumed to adaptable to enable threat hunts to performed in dynamic or otherwise evolving network environments. In some embodiments, threat hunting plans may be directed to particular types of threat hunts, such as intrusion/infiltration threats, data exfiltration threats, unauthorized application access, insider attacks, insider security weakness, or the like.

In some embodiments, threat hunting engines may be arranged to enable administrators to schedule one or more particular threat hunting plans to be executed periodically. Also, in some embodiments, threat hunting engines may be arranged to enable threat hunting with particular threat hunting plans to execute in response to one or more declared conditions. For example, for some embodiments, a particular threat hunting plan may be configured to execute if sensitive file systems or databases have been accessed from particular endpoints. Likewise, in some embodiments, other threat hunting plans may be configured to execute in response to observed but assumed failed cyberattacks. For example, in some embodiments, threat hunting engines may be configured to execute particular threat hunting plans in response to a large scale phishing attacked directed to an organization. Thus, in this example, even if the phishing attack campaign seemed to be unsuccessful, one or more threat hunts may be initiated as precaution.

In some embodiments, agents, such as agent 510 or agent 516 may be directed to one or more evidence sources, such as evidence source 512 or evidence source 518. As mentioned, in some embodiments, evidence sources may include various data stores, file systems, services, information feeds, email systems, instant messaging platforms, social media platforms, system logs, or the like.

Also, in some embodiments, evidence sources may include operating environments, configuration settings, or the like. Accordingly, in some embodiments, information such as, installed applications, application versions, kernel modules, system libraries, or the like may be collected as threat hunting evidence. Thus, in some cases, threat hunts may identify if unauthorized applications, libraries, kernel modules, or the like may be installed or active in an environment that may be under investigation.

In some embodiments, threat hunting engines may be arranged to instantiate one or more agents on demand or otherwise in response to instructions included in threat hunting plans. Accordingly, in some embodiments, threat hunting engines may be arranged to scale up individual investigations depending on various considerations, such as priority, available resources, type of evidence source, or the like. For example, for some embodiments if the evidence source of interest may be a large file system, threat hunting engines may be configured to instantiate multiple agents each directed to collect evidence from different portions of the file system. In contrast, if the evidence of interest may be held by another service, a single agents may be used to interrogate the other service to collect threat hunting evidence rather than using more than one agent.

Further, in some embodiments, threat hunting engines may be arranged to perform some evidence gathering actions directly rather than instantiating separate agents to collect the evidence. In such instances, it may be assumed the threat hunting engine may be operating as its own evidence gathering agent. Likewise, in some embodiments, agents may be configured to use APIs or interfaces of the threat hunting engine or other systems to perform some or all of their actions. For example, a bare-bone agent may be configured to execute a sequence of instructions that call APIs presented by the threat hunting engine rather than hosting independent or separate instructions.

In some embodiments, threat hunting engines may be arranged to evaluate the collected threat evidence to categorize or rank evidence items. In some embodiments, evidence determined to be irrelevant for an investigation may be excluded from further consideration. In some embodiments, threat hunting engines may be arranged to perform other data processing actions, including de-duplicating evidence items, identifying aliased evidence items (e.g., two differently named items that reference the same underlying information), obtaining metrics about the evidence items, or the like.

Accordingly, in some embodiments, evidence items determined to be unnecessary or irrelevant for an investigation may be identified (e.g., tagged or marked) or discarded. In some embodiments, evidence indicated as irrelevant may be stored in the evidence repository until the associated investigation has been completed.

In some embodiments, if a threat hunting engine reduces the evidence set for a particular investigation, the threat hunting engine may then execute in depth analysis of the remaining threat evidence items.

Note, in some embodiments, evidence items may be considered to be data structures for storing information associated with evidence data collected by the various evidence collection mechanisms. Accordingly, in some embodiments, evidence items may include various fields that may hold various information associated with a piece of evidence, including the raw evidence data or reference there—to, meta-data associated with the evidence data, metrics associated with the evidence data, or the like. In some cases, for some embodiments, the particular information included in an evidence item may vary depending on various factors, such as the type of evidence, source of the evidence, directives included in the threat hunting plan, or the like.

In some embodiments, threat hunting engines may be arranged to evaluate the reduced set of evidence items to infer or predict if the evidence indicates that a threat may exist. In some embodiments, some threat hunting plans may declare the particular criteria for determining if a threat should be inferred. Accordingly, in some embodiments, threat determination conditions or rules may vary depending on the type of investigation.

Also, in some embodiments, threat hunting engines may assign a confidence score or threat score to various investigation results. Accordingly, in some embodiments, threat hunting engine may be arranged to recognize threats associated with scores that exceed a threshold value as a credible threat. Further, in some embodiments, threat hunting engines may be configured to assign different threat thresholds to different types of investigations or different targets of investigations.

In some embodiments, threat hunting engine may be arranged to generate an event or event-like data structure such as event 522. In some embodiments, threat hunting engines may be arranged to collect and evaluate threat evidence to determine if an full investigation should be conducted by an analysis engine. Accordingly, in some embodiments, threat hunting engines may be arranged to generate an event, such as event 522 that may be provided to analysis engines for additional handling. In some embodiments, analysis engines may be arranged to generate investigation reports, such as investigation report 526 based on the investigation or analysis of event 522. In some embodiments, threat hunting engines may be configured to provide completed threat investigations to analysis engines for further analysis such that the entire investigation may be considered an event that merits further investigation. Thus, in some embodiments, if the analysis engine supports automated event investigation, the threat hunting report may be considered an event that may trigger an incident investigation.

Also, in some embodiments, threat hunting engines or analysis engines may be arranged to provide user interfaces that enable users to review previously completed or pending threat hunts. In some embodiments, threat hunting engines may be arranged to enable users to access incomplete threat investigation reports to review the status of the investigations.

Figure 6:
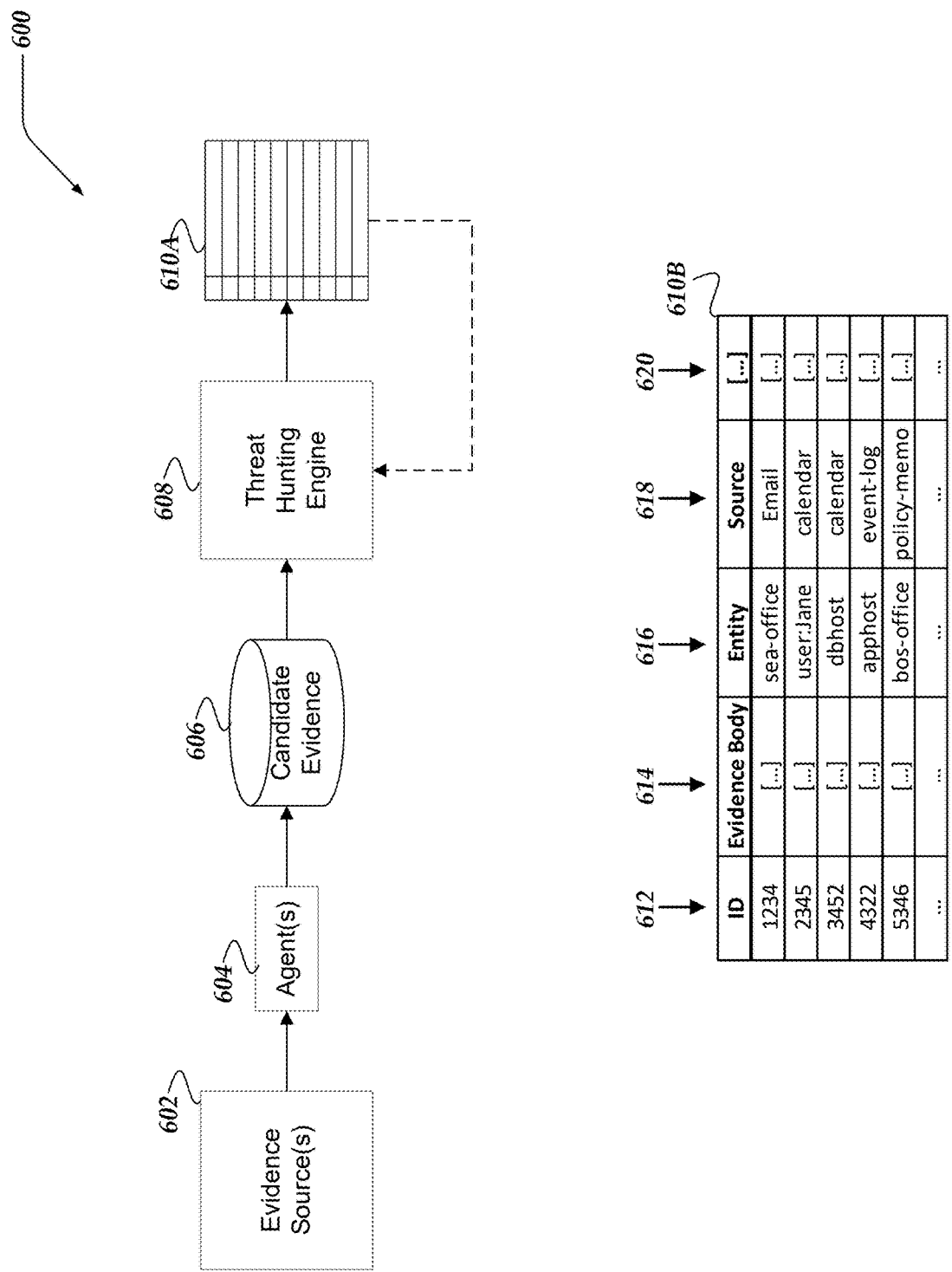
FIG. 6 illustrates a logical schematic of a system for automated threat hunting in accordance with one or more of the various embodiments.

FIG. 6 illustrates a logical schematic of system 600 for automated threat hunting in accordance with one or more of the various embodiments.

As described above, threat hunting engines, such as threat hunting engine 608 may be arranged to instantiate or initialize one or more agents, such as agents 604 to collect threat evidences from various evidence sources, such as evidence sources 602. In some embodiments, threat hunting engines (or agents) may be arranged to stored the collected evidence in a candidate evidence data store. In some embodiments, the data store may be an evidence repository (or a portion thereof) as discussed above.

In some embodiments, evidence collection agents may be configured to generously collect data from the source targets as per their particular threat hunting plan. For example, an agent may be directed to collecting all the meta-data (e.g., create time, last accessed, permissions, ownership, file name, path, or the like) for one or more directories in a file system. Similarly, for example, an agent configured to collect log file entries may simply collect all of the log records written within a declared time window. In practice, the initial evidence collection may produce thousands of candidate evidence items.

Accordingly, in some embodiments, threat hunting engines may be arranged to evaluate the candidate evidence to identify which candidate evidence may be ignored or discarded before performing additional investigations. Further, in some embodiments, as mentioned, threat hunting engines may be arranged to perform various data processing or data cleaning on the candidate evidence to prepare it for a deeper analysis performed by the analysis engine. For example, in some embodiments, threat hunting engines may be arranged to perform operations, such as de-duplication, or the like.

Thus, in some embodiments, threat hunting engines, such as threat hunting engine 608 may be arranged to generate an investigation evidence sets, such as evidence set 610A that includes evidence that may be useful for identify threats or potential threats. In some embodiments, evidence sets may be assumed to be a highly reduced or curated set of information (e.g., evidence items) that may be relevant for investigating the existence of threats.

In some embodiments, evidence sets, such as evidence set 610B (an expanded view of evidence set 610A) may include one or more evidence items that include various fields or attributes that represent the evidence of interest. In this example, evidence set 610B has column 612 for representing an internal identifier of the evidence item, column 614 for storing the actual evidence data, column 616 for representing an entity that may be associated with the evidence item, column 618 for representing the source where the evidence originated, column 620 represents additional fields that may be associated with a particular evidence item. In some embodiments, vetted evidence items included in evidence sets, such as evidence set 610B may be referred to a leads because they may be investigated further.

Figure 7:
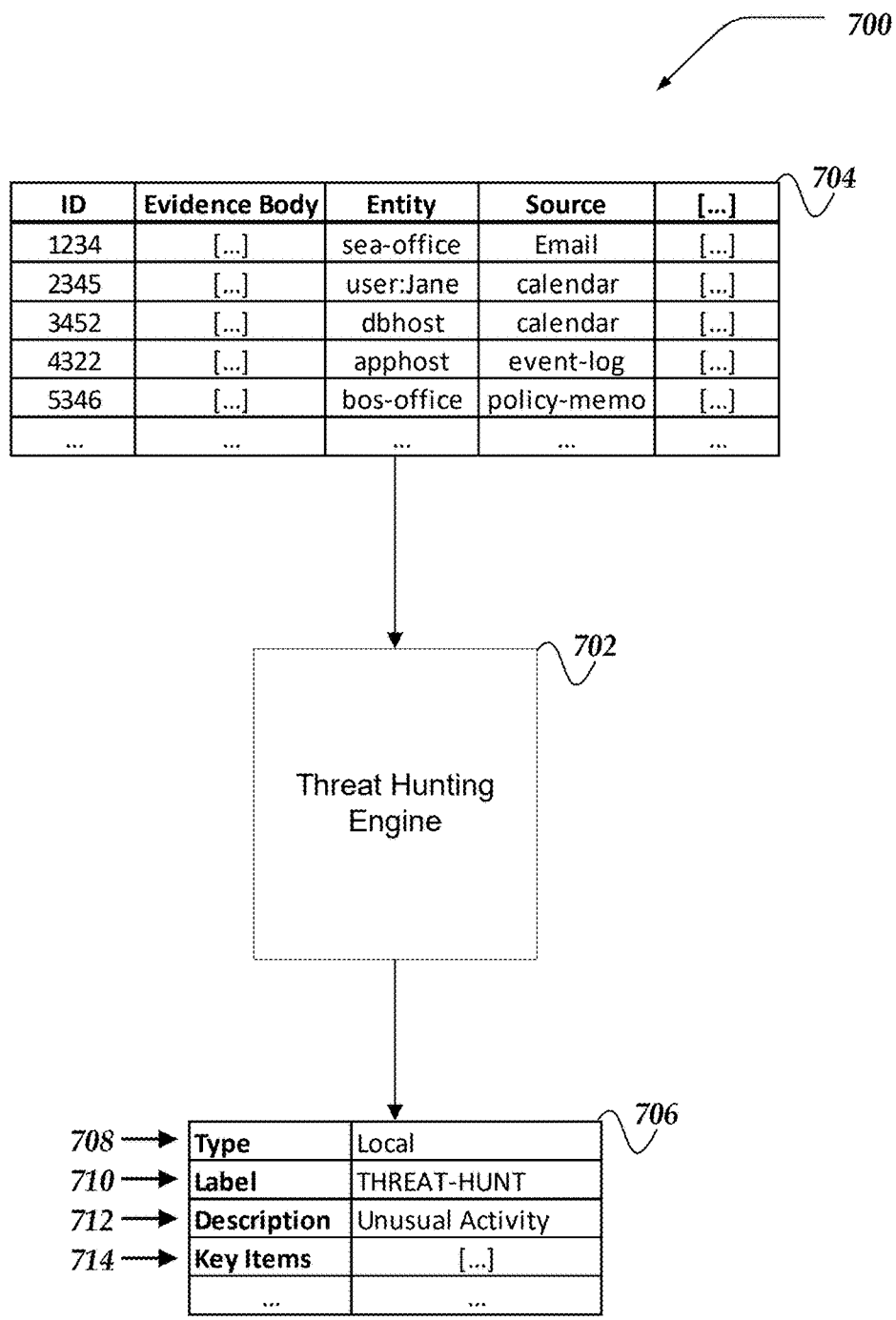
FIG. 7 illustrates a logical schematic for a system for automated threat hunting in accordance with one or more of the various embodiments.

FIG. 7 illustrates a logical schematic for system 700 for automated threat hunting in accordance with one or more of the various embodiments.

As described herein, in some embodiments, threat hunting engines, such as threat hunting engine 702 may be provided evidence sets, such as evidence set 704 which include one or more evidence items that have been determined to relevant to the threat hunt. See, FIG. 6 for a detailed description of evidence sets.

Accordingly, in some embodiments, threat hunting engines may be arranged to fully investigate the remaining evidence items individually and in view of each other. As described herein, in some embodiments, evidence items included in evidence sets may each be considered investigative leads for the current threat hunt.

In some embodiments, threat hunting engines may be arranged to execute deeper investigations into each lead (e.g., evidence item) included in the evidence set. In some embodiments, threat hunting engines may be arranged to In some embodiments, if the threat hunting engine determines that the evidence set may be related to a threat or potential threat, threat hunting engines may be arranged to generate one or more threat profiles, such as threat profile 706 that may be provided to analysis engines for further investigation. In some embodiments, threat profiles may be formatted or configured to appear or operate as an event or event-like message. Accordingly, in some embodiments, threat hunting engines may submit threat profiles (as events) to one or more internal or external service that may be enable to consume events. Thus, in some embodiments, other event/network monitoring services (besides or otherwise not limited analysis engines) may consume the threat hunt event and process it as they do other events. In the case of analysis engines, threat profiles may initiate automated incident investigations similar to how events from other sources may be processed.

In some embodiments, threat hunting engines may be arranged to format threat profiles to match the requirements of the receiver of the threat profile. Accordingly, in some embodiments, threat hunting engine may be configured to apply threat profile transformers to format threat profiles to conform to one or more registered targets, including analysis engines. In some embodiments, threat profile transformers may be considered to be data structures that include the instructions that may be executed to generate properly formatted event messages for particular targets. In some embodiments, threat hunting engines may be configured to communicate threat profiles to more than one target. Accordingly, in some embodiments, threat hunting engines may be arranged to employ more than one threat profile transformer to generate the event messages.

In this example, for some embodiments, threat profile 706 includes various fields, such as field 708 for indicating an event type for the threat profile, field 710 for holding a label associated with the threat profile, field 712 that includes a natural language text description of the threat profile, field 714 for including the key evidence items that contributed to the conclusion that resulting in the generation of the threat profile. One of ordinary skill in the art will appreciate that threat profiles or events based on threat profiles may include more or fewer field than shown here depending on the particular threat hunt results, the threat hunt plan, the target/receiver of the threat profile, or the like. In some embodiments, the particular fields or formatting for threat profiles or events based on threat profile may be determined based on the threat profile transformer, or the like. Accordingly, one of ordinary skill in the art will appreciate that the number of fields, type of field, field name, format, layout, or the like may vary depending on local circumstances or local requirements. Thus, in some embodiments, threat hunting engine may be arranged to determine threat profile formatting and contents based on configuration information that provided the necessary instructions or rules.

Figure 8:
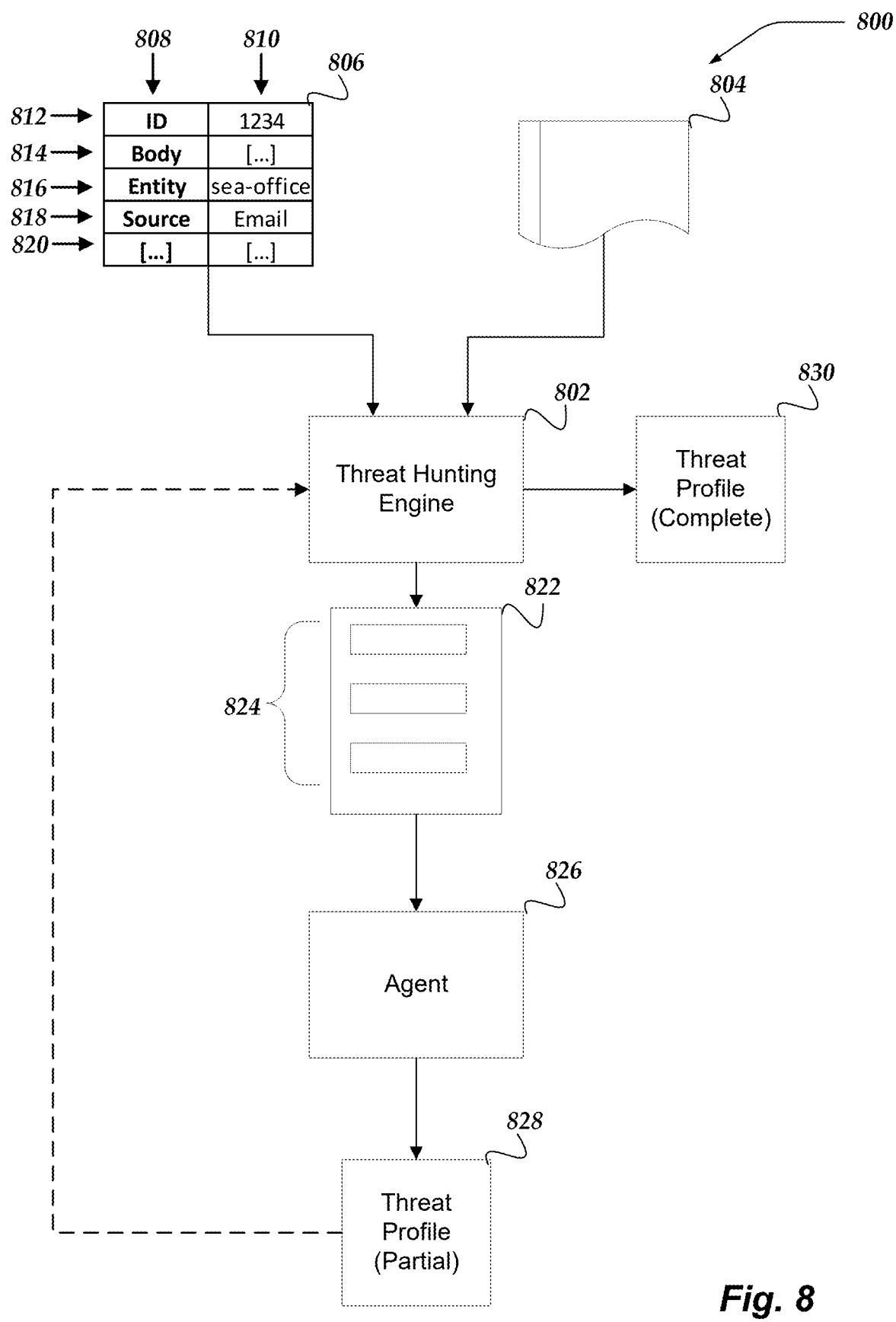
FIG. 8 illustrates a logical schematic for a system for automated threat hunting in accordance with one or more of the various embodiments.

FIG. 8 illustrates a logical schematic for system 800 for automated threat hunting in accordance with one or more of the various embodiments. As described above, threat hunting engines, such as threat hunting engine 802 may be arranged to gather candidate evidence and then reduce the candidate evidence to a much smaller number of evidence items that represent investigative leads for the current threat hunt. Accordingly, in some embodiments, threat hunting engines may be arranged to perform deep investigation of each evidence item (e.g., lead) that may include in an evidence set.

In this example, for some embodiments, threat hunting engine 802 may be arranged to obtain one or more evidence items, such as evidence item 806 along with a pending threat hunting plan, such as threat hunting plan 804 for the current threat hunting investigation.

In some embodiments, threat hunting plan 804 may be the original threat hunting plan selected for the threat hunt. Also, in some embodiments, during the evidence collection operations, one or more other threat hunting plans (or threat hunting plan portions) may be selected. Accordingly, in some embodiments, if the initial evaluation of the candidate evidence indicates that another threat hunting plan should be employed, threat hunting plan 804 may not be same threat hunting plan as used in the beginning of threat hunt.

In some embodiments, threat hunting engines may be arranged to obtain a particular threat hunting plan for one or more evidence items. For example, an evidence item associated with user may be associated with a different threat hunting plan than an evidence item associated with an endpoint, application, location/department, or the like.

In some cases, in some embodiments, one or more evidence items may be grouped together. For example, two or more evidence items associated with the same user may be grouped together. Accordingly, in some cases, more than one evidence item may be investigated at the same time or otherwise as a group.

In some embodiments, threat hunting engine 802 may be arranged to generate an agent prompt, such as prompt 820 for conducting the investigation using generative AI systems. In some embodiments, prompts, such as prompt 820 may include one or more sections, such as sections 822 that may be injected based on the current threat hunting plan and the current evidence items. In some embodiments, more than one prompt section may be directed to the same evidence item.

Also, one of ordinary skill in the art will appreciate that threat hunting engines are not limited to using generative AI for threat hunting. In some embodiments, threat hunting engines may be arranged to execute various data processing, data analysis, statistical analysis, or the like, based on built-in facilities. Further, in some embodiments, threat hunting engines may be arranged to use one or more external services (not shown here) for performing one or more portions of threat hunt investigations. Also, in some embodiments, threat hunting plan may include instructions that reference one or more internal or external APIs for performing data processing, data analysis, statistical analysis, or the like. Further, in some embodiments, threat hunting plan may include particular instructions that may be incorporated into pending investigations.

FIG. 8 illustrates a logical schematic for system 800 for automated threat hunting in accordance with one or more of the various embodiments.

As described above, in some embodiments, threat hunting engines may be arranged to collect candidate evidence, filter or curate the candidate evidence down to a much smaller collect of evidence items which may be considered leads for the pending threat hunt.

Accordingly, in some embodiments, threat hunting engines may be arranged to conduct a threat investigation for each evidence item.

In this example, for some embodiments, threat hunting engine 802 may be arranged to obtain a threat hunting plan, such as threat hunting plan 804 and an evidence item, such as evidence item 806. In some embodiments, threat hunting plan 804 may be considered at least of portion of the threat hunting plan that initiated the pending threat hunt. In some embodiments, the threat hunting plan may include instructions, rules, queries, or the like for the threat hunt.

Also, in this example, for some embodiments, evidence item 806 may be considered to be an evidence item from an evidence set (not shown). Evidence item 806 may be considered to similar to evidence items described in FIG. 7. Accordingly, in this example, evidence item 806 includes column 808 for storing field labels and column 810 for storing field values. Further, in this example, evidence item 806 includes various fields, such as field 812 for storing identifiers for the evidence item, field 814 for storing the raw data associated with the evidence item, field 816 for storing identifiers or references to one or more entities that may be associated with the evidence item, field 818 for storing identifiers or references to one or more sources associated with the evidence item, field 820 for other/additional fields, or the like.

In some embodiments, field 814 may include data extracted from evidence sources during evidence collection. As such, in some embodiments, field 814 may include data from arbitrary sources that the threat hunting plan identified as evidence sources. In some cases, for some embodiments, field 814 may include unstructured natural language text, structure data (e.g., JSON objects, XML snippets, key-value pairs, or the like), numerical information, or the like.

In some embodiments, threat hunting engines may be configures to use generative AI systems to conduct one or more portions of the investigation of evidence item 806. Accordingly, in some embodiments, threat hunting engine 802 may be arranged to generate or obtain prompt 822 which may be directed to the evidence item being investigated. In this example, for some embodiments, prompt sections 824 represent different portions of instructions, guidelines, queries, or the like that may be included in prompt 822. In some embodiments, threat hunting plans, such as threat hunting plan may declare which prompt templates, prompt section templates, generative AI models, or the like may be used for as part of the investigation.

In some embodiments, threat hunting engines may be arranged to instantiate one or more agents, such as agent 826 to conduct the investigation. In some embodiments, threat hunting engine 802 may be arranged to instantiate agent 826 such that it may include one or more prompts, such as prompt 822. Further, in some embodiments, agents may include heuristics, filters, instructions, or the like as well as generative AI prompts. Also, in some embodiments, one or more instantiated agents may include conventional NLP, data processing, statistical methods, or the like, such that using generative AI should be considered a requirement. In some embodiments, individual agents may be targeted to particular types of evidence item, threat hunt targets, threat hunt hypotheses, or the like.

In some embodiments, each agent, such as agent 826 may be arranged to generate information that may be included or represented as a partial threat profile, such as partial threat profile 828. In some embodiments, threat hunting engines may be arranged to maintain a running partial threat profile that may be updated by the results of investigations into one or more of the other evidence items included in the current evidence set of the pending threat hunt. Also, in some embodiments, threat hunting engines may be configured to generate separate partial threat profiles for each evidence item. Accordingly, in some embodiments, threat hunting engine may be arranged to merge the one or more partial threat profiles into a single threat profile, such as threat profile 830 for delivery to analysis engines or other targets that may be registered to obtain the threat profile.

In this example, the dashed line looping from partial threat profile 828 back to threat hunting engine 802 represents how the investigation may continue until each evidence item in an evidence set has been fully evaluated.

Figure 9:
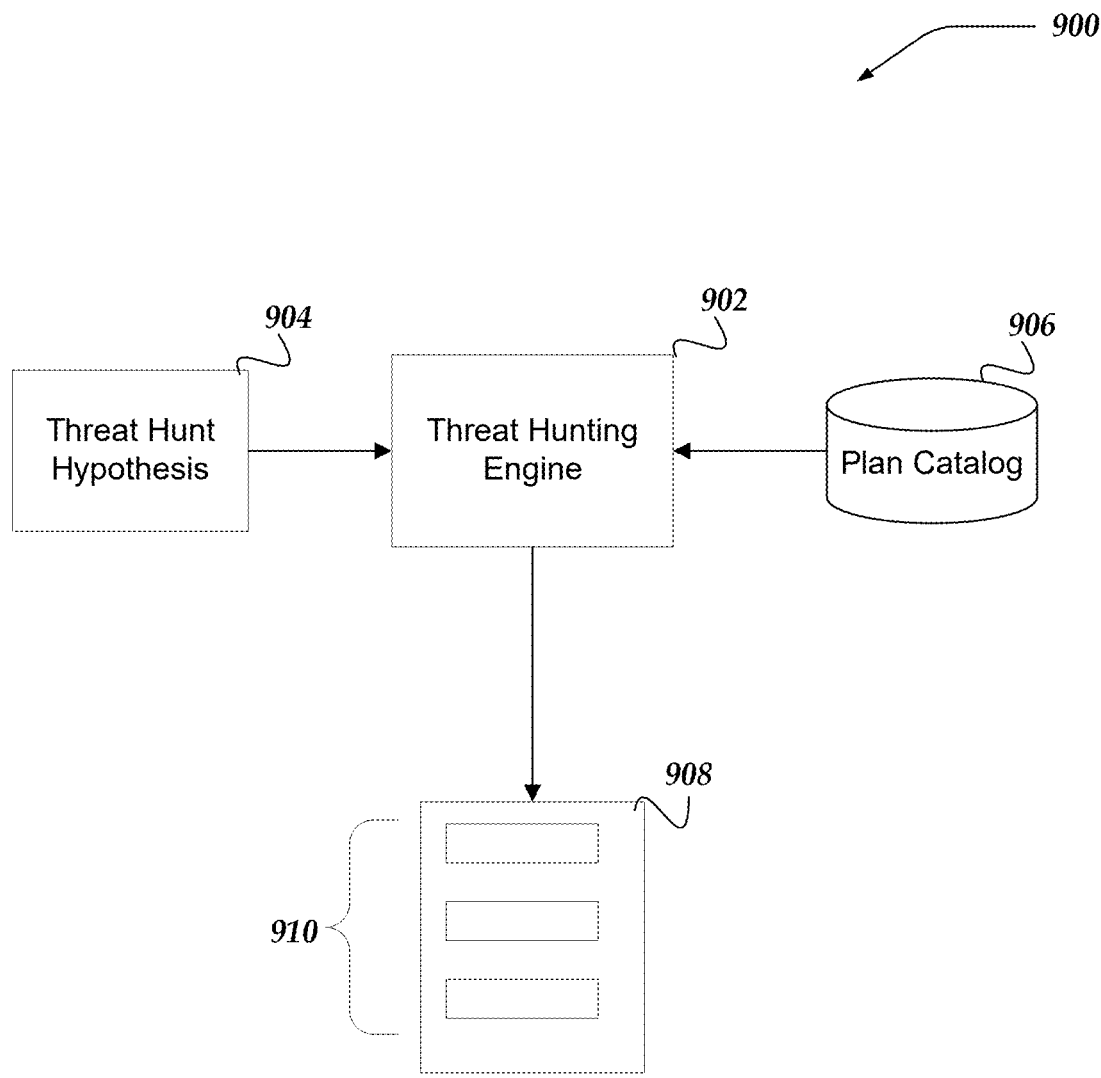
FIG. 9 illustrates a logical schematic of a system for automated threat hunting in accordance with one or more of the various embodiments.

FIG. 9 illustrates a logical schematic of system 900 for automated threat hunting in accordance with one or more of the various embodiments.

As described herein, in some embodiments, threat hunting plans may be data structures that include or declare one or more operations, instructions, guidelines, source targets, or the like for automated threat hunting. Accordingly, in some embodiments, threat hunting engines may be arranged to execute one or more actions based on threat hunting plans to perform automated threat hunting.

In some embodiments, often a threat hunt may be initiated by or based on a proposed hypothesis. In some embodiments, threat hunting engines may be configured with one or more threat hypotheses that may be used for initiating automated threat hunts. Further, in some embodiments, threat hunting engines may be arranged to use one or more user interfaces to collect threat hypotheses from users. Likewise, in some embodiments, threat hunting engines may be arranged to obtain or generate threat hypotheses based on periodic monitoring of activity in the network, or the like.

In some embodiments, threat hunting engines may be arranged to periodically or randomly choose a threat hypotheses and perform an associated threat hunt. Also, in some embodiments, threat hunting engines may be arranged to scan particular source targets for conditions that may trigger a threat hunt. For example, for some embodiments a threat hunting engine may be configured to initiate a threat hunt if a number of attempts to access a protected entity exceeds a threshold value. Likewise, for example, a threat hunt may be triggered if an restricted file system is accessed.

In some embodiments, threat hypotheses may be considered to be educated assumptions or questions that guide threat hunt investigations to uncover potential threats or malicious activities. In most cases, these hypotheses may be based on known attack patterns, threat intelligence, anomalies observed in the environment, or the like. For example, some examples of threat hunt hypotheses related to network security may include, unauthorized data exfiltration, malicious/malware command and control communication, malicious DNS tunneling, suspicious encrypted traffic, or the like. One of ordinary skill in the art will appreciate the set of threat hypothesis is unbounded and dynamic in the face of evolving technology or evolving threats. Accordingly, in some embodiments, threat hunting engines may be arranged to be adaptable to new or different threat hypotheses. Further, in some embodiments, threat hunting engines may be arranged to accept new or different threat hypotheses on the fly if provided by users. For example, a user may provide a new research question that may drive the formulation of a new or different threat hypotheses.

In practice, threat hypotheses may generally include a hypothesis statement such as "A VPN account is being used outside of normal business hours or from an unusual geographic location," a rationale for the hypothesis, a hunt approach or strategy, or the like.

In some embodiments, threat hunting plans may include instructions for guiding or perform threat hunts that may be directed to particular threat hypotheses. As mentioned above, in some cases, threat hunting engines may be arranged to cycle through a known or otherwise predefined collection threat hypotheses. Also, in some embodiments, threat hunting engines may be configured to accept threat hypotheses from users or other sources. In some cases, for some embodiments, a user provided threat hypothesis may be matched to an existing or otherwise well-developed hypothesis. In other cases, the user provided threat hypothesis may be new hypothesis that has not been encountered before.

In either case, in some embodiments, threat hunting engines may be arranged to match threat hypotheses with one or more threat hunting plans. In some embodiments, threat hunting engine may be arranged to match threat hypotheses with threat hunting plans using one or more matching operations. In some embodiments, threat hunting engines may be arranged to generate a prompt that includes the hypothesis statement and employ generative AI to propose matched threat hunting plans. Also, in some embodiments, threat hunting engines may be arranged to use conventional methods such as key word matching, similarity determinations, other NLP methods, or the like, for matching threat hypotheses with threat hunting plans.

In some embodiments, threat hunting plans may be comprised of different sections that include directives for collecting candidate evidence, evaluating candidate evidence, investigating evidence items, or the like. Accordingly, in some embodiments, threat hunting engines may be configured to obtain threat hunting plans that include one or more sections that were each matched to the threat hypothesis.

In some embodiments, threat hunting engines may be arranged to associate particular threat hunting plans with known or built-in threat hypotheses rather than be required to infer or propose a threat hunting plan. For example, hypotheses associated with suspicious encrypted traffic may be automatically one or more particular threat hunting plans directed to that type of hypothesis.

Accordingly, in some embodiments, threat hunting engines, such as threat hunting engine 902 may obtain a threat hypothesis, such as threat hypothesis 904. In some embodiments, threat hunting engines may be arranged to match threat hypothesis 904 with a threat hunting plan obtained from a threat hunting plan data store, such as plan catalog 906. Accordingly, in some embodiments, threat hunting engines may obtain a threat hunting plan, such as threat hunting plan 908. In some embodiments, threat hunting plans may include one or more sections, such as section 910, as described above that may be matched or selected for inclusion in a threat hunting plan.

In some embodiments, threat hunting engines may be arranged to track the performance of threat hunting plans or threat hunting plan sections. Accordingly, in some embodiments, if a threat hunting plan or threat hunting plan section produces unsatisfactory results it may be de-ranked or discarded from future consideration. In some embodiments, threat hunting engines may be arranged to evaluate threat hunting plans or threat hunting plan sections based on active user feedback, success or failure in identifying threats, passive user feedback (e.g., users ignore the recommendations or warnings), or the like.

Generalized Operations

FIGS. 10-15 represent generalized operations for automated threat hunting in accordance with one or more of the various embodiments. In one or more of the various embodiments, processes 1000, 1100, 1200, 1300, 1400, and 1400 described in conjunction with FIGS. 10-15 be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 10-15 may be used for automated threat hunting in accordance with at least one of the various embodiments or architectures such as those described in conjunction with FIGS. 1-9. Further, in one or more of the various embodiments, some or all of the actions performed by processes 1000, 1100, 1200, 1300, 1400, and 1500 may be executed in part by analysis engine 322, threat hunting engine 324, ingestion engine 326, agents 327, telemetry engine 328, or the like, running on one or more processors of one or more network computers.

Figure 10:
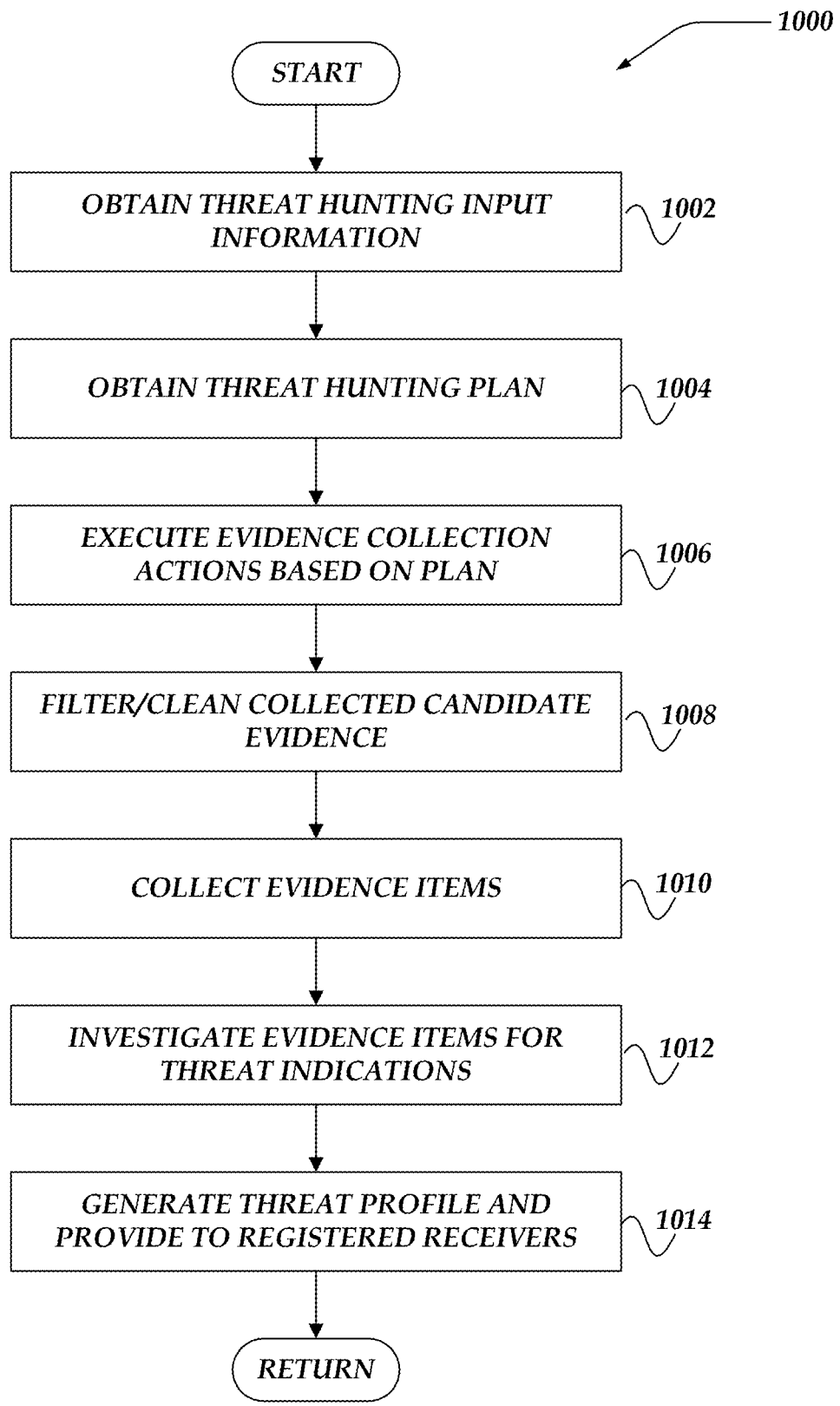
FIG. 10 illustrates an overview flowchart of a process for automated threat hunting in accordance with one or more of the various embodiments.

FIG. 10 illustrates an overview flowchart of process 900 for automated threat hunting in accordance with one or more of the various embodiments. After a start block, at block 1002, in one or more of the various embodiments, threat hunting engines may be arranged to obtain threat hunting input information. In some embodiments, threat hunting input information may include threat hypotheses, scheduled threat hunting triggers, user-initiated investigations, automated threat detection alerts, or the like. In some embodiments, threat hunting engines may be arranged to monitor various sources for conditions that may warrant proactive threat investigations, including security information and event management systems, network monitoring platforms, user behavior analytics, endpoint detection systems, or the like. Accordingly, in some embodiments, threat hunting engines may be configured to accept threat hunting requests from security analysts, automated security systems, compliance requirements, periodic security assessments, or the like. In some embodiments, threat hunting input information may include specific indicators of compromise, suspicious network patterns, anomalous user behaviors, unauthorized access attempts, or the like that may trigger automated threat hunting activities. In some embodiments, threat hunting engines may be arranged to prioritize threat hunting input information based on threat severity levels, organizational risk profiles, resource availability, regulatory compliance requirements, or the like.

At block 1004, in one or more of the various embodiments, threat hunting engines may be arranged to obtain one or more threat hunting plans based on the threat hunting input information.

In some embodiments, threat hunting plans may be selected from threat hunting plan repositories based on threat types, target environments, investigation scopes, evidence source requirements, or the like. In some embodiments, threat hunting engines may be arranged to match threat hunting input information with predefined threat hunting plan templates using pattern matching algorithms, natural language processing, machine learning classifiers, similarity scoring mechanisms, or the like. Accordingly, in some embodiments, threat hunting engines may be configured to customize threat hunting plans based on specific organizational environments, available evidence sources, security tool configurations, network architectures, or the like. In some embodiments, threat hunting plans may include evidence collection strategies, investigation methodologies, analysis frameworks, reporting requirements, escalation procedures, or the like. In some embodiments, threat hunting engines may be arranged to combine multiple threat hunting plan components to address complex threat scenarios, multi-stage attacks, distributed threats, persistent threats, or the like.

At block 1006, in one or more of the various embodiments, threat hunting engines may be arranged to execute one or more evidence gathering actions based on the threat hunting plan.

In some embodiments, evidence gathering actions may include deploying evidence collection agents to various evidence sources, configuring data extraction processes, establishing evidence repository connections, initializing evidence filtering mechanisms, or the like. In some embodiments, threat hunting engines may be arranged to coordinate evidence collection across multiple evidence sources simultaneously, including system logs, network traffic captures, endpoint forensics data, user activity records, application logs, or the like. Accordingly, in some embodiments, threat hunting engines may be configured to scale evidence collection operations based on investigation scope, available computational resources, evidence source capacity, time constraints, or the like. In some embodiments, evidence gathering actions may be executed using specialized collection agents that interface with security information systems, file systems, databases, network monitoring tools, cloud platforms, or the like. In some embodiments, threat hunting engines may be arranged to implement evidence collection schedules, resource allocation strategies, collection prioritization rules, evidence validation procedures, or the like to optimize threat hunting effectiveness.

At block 1008, in one or more of the various embodiments, threat hunting engines may be arranged to filter or clean the collected candidate evidence.

In some embodiments, filtering candidate evidence may include removing irrelevant data, eliminating duplicate records, standardizing data formats, validating evidence integrity, identifying corrupted evidence items, or the like. In some embodiments, threat hunting engines may be arranged to apply evidence quality filters based on source reliability metrics, temporal relevance criteria, data completeness indicators, format consistency requirements, or the like. Accordingly, in some embodiments, threat hunting engines may be configured to execute data deduplication processes, anomaly detection algorithms, data validation routines, format normalization procedures, or the like to prepare candidate evidence for analysis. In some embodiments, evidence cleaning operations may include resolving entity aliases, correlating related evidence items, establishing temporal sequences, identifying evidence relationships, or the like. Thus, in some embodiments, threat hunting engines may be arranged to reduce the volume of candidate evidence while preserving critical threat indicators, maintaining evidence chains, ensuring analytical accuracy, supporting investigation requirements, or the like.

At block 1010, in one or more of the various embodiments, threat hunting engine may be arranged to collect one or more evidence items based on the candidate evidence.

In some embodiments, evidence items may be selected from filtered candidate evidence based on threat relevance scores, investigation priority levels, evidence quality metrics, analytical value assessments, or the like. In some embodiments, threat hunting engines may be arranged to prioritize evidence items that demonstrate potential threat indicators, unusual behavioral patterns, security policy violations, suspicious network activities, or the like. Accordingly, in some embodiments, threat hunting engines may be configured to generate evidence item data structures that include evidence content, source attribution, temporal metadata, entity associations, confidence indicators, or the like. In some embodiments, evidence items may be organized into investigation leads, evidence categories, threat vectors, entity groupings, temporal clusters, or the like to facilitate systematic threat analysis. In some embodiments, threat hunting engines may be arranged to maintain evidence provenance information, establish evidence relationships, preserve analytical context, support investigation traceability, or the like throughout the evidence collection process.

At block 1012, in one or more of the various embodiments, threat hunting engines may be arranged to investigate one or more evidence items for one or more threat indications.

In some embodiments, threat investigation processes may include behavioral analysis, pattern recognition, anomaly detection, correlation analysis, threat intelligence integration, or the like to identify potential security threats. In some embodiments, threat hunting engines may be arranged to employ investigation agents that utilize large language models, machine learning algorithms, statistical analysis methods, heuristic evaluation techniques, or the like to analyze evidence items. Accordingly, in some embodiments, threat hunting engines may be configured to generate investigation prompts for generative AI systems that may include evidence content, threat hunting context, investigation guidelines, analysis frameworks, or the like to guide automated threat analysis. In some embodiments, threat investigations may evaluate evidence items for indicators of compromise, attack patterns, malicious behaviors, security vulnerabilities, policy violations, or the like. Thus, in some embodiments, threat hunting engines may be arranged to produce threat assessments, confidence scores, risk ratings, evidence correlations, investigation findings, or the like for each analyzed evidence item.

At block 1014, in one or more of the various embodiments, threat hunting engines may be arranged to generate a threat profile and forward it to one or more registered receivers.

In some embodiments, threat profiles may include threat summaries, evidence documentation, investigation findings, risk assessments, recommended actions, or the like that comprehensively describe identified threats. In some embodiments, threat hunting engines may be arranged to format threat profiles as structured event messages, investigation reports, security alerts, compliance documentation, or the like to support various organizational security processes. Accordingly, in some embodiments, threat hunting engines may be configured to distribute threat profiles to analysis engines, security incident response teams, compliance monitoring systems, threat intelligence platforms, or the like based on threat severity levels, organizational policies, regulatory requirements, or the like. In some embodiments, threat profiles may trigger automated security responses, incident investigation workflows, threat mitigation procedures, security policy updates, or the like within integrated security management systems. Thus, in some embodiments, threat hunting engines may be arranged to maintain audit trails, generate investigation documentation, update threat intelligence repositories, support continuous security improvement processes, or the like based on completed threat hunting activities.

Next, in one or more of the various embodiments, control may be returned to a calling process.

Figure 11:
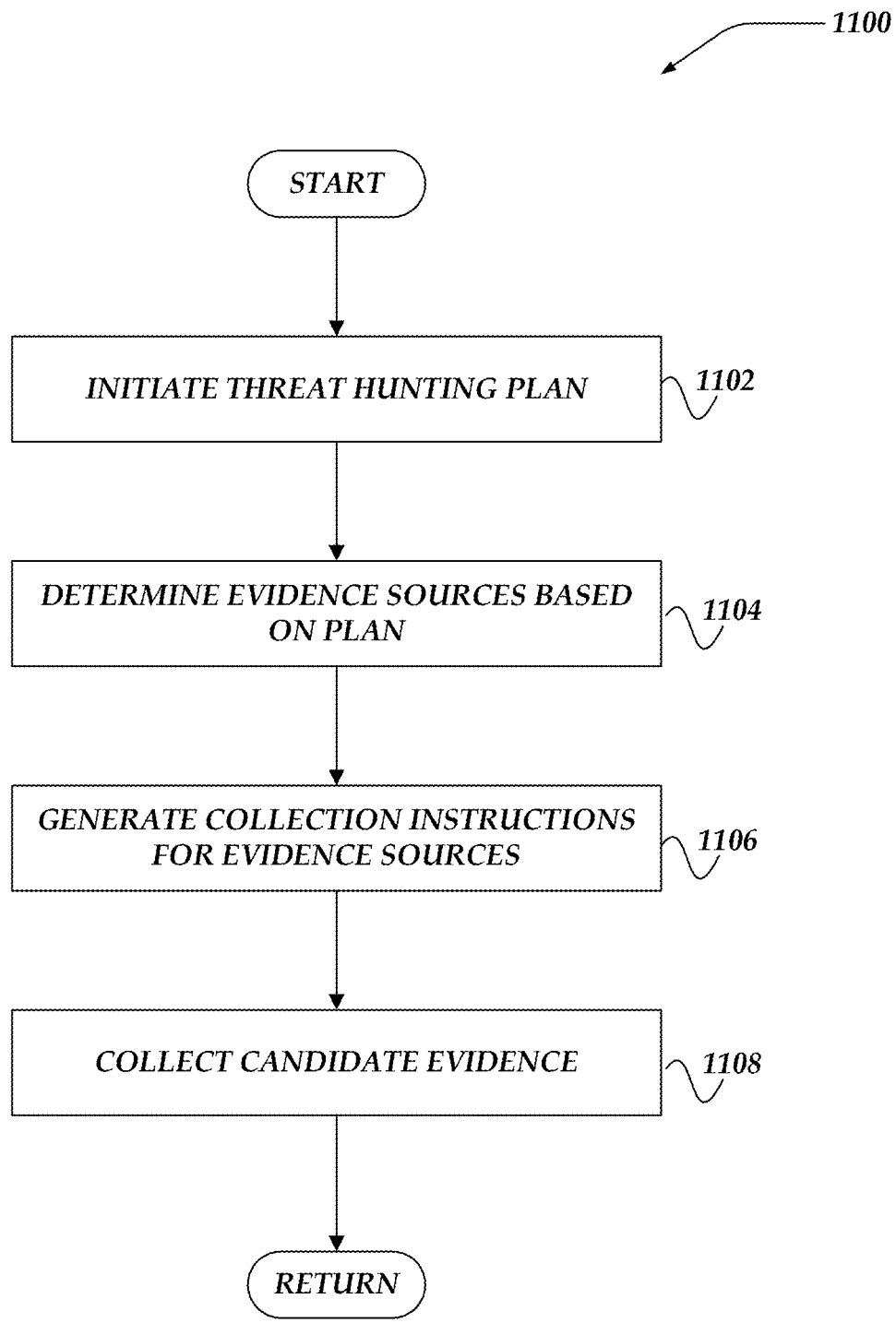
FIG. 11 illustrates a flowchart of a process for automated threat hunting in accordance with one or more of the various embodiments.

FIG. 11 illustrates a flowchart of process 1100 for automated threat hunting in accordance with one or more of the various embodiments. After a start block, at block 1102, in one or more of the various embodiments, threat hunting engines may be arranged to initiate a threat hunting plan.

In some embodiments, threat hunting engines may be arranged to select threat hunting plans from threat hunting plan repositories based on threat hypotheses, scheduled investigations, user-initiated hunts, automated trigger conditions, or the like. In some embodiments, threat hunting engines may be configured to match threat hunting input information with predefined threat hunting plan templates using pattern matching algorithms, natural language processing, machine learning classifiers, similarity scoring mechanisms, or the like. Accordingly, in some embodiments, threat hunting engines may be arranged to customize threat hunting plans based on specific organizational environments, available evidence sources, security tool configurations, network architectures, or the like. In some embodiments, threat hunting plans may include evidence collection strategies, investigation methodologies, analysis frameworks, reporting requirements, escalation procedures, or the like. In some embodiments, threat hunting engines may be arranged to combine multiple threat hunting plan components to address complex threat scenarios, multi-stage attacks, distributed threats, persistent threats, or the like.

At block 1104, in one or more of the various embodiments, threat hunting engines may be arranged to determine one or more evidence sources based on the plan.

In some embodiments, threat hunting engines may be arranged to identify evidence sources based on specifications in threat hunting plans. In some embodiments, sources may include, system logs, network traffic captures, endpoint forensics data, user activity records, application logs, security information and event management systems, or the like. In some embodiments, threat hunting engines may be configured to evaluate evidence source availability, accessibility, data quality, temporal coverage, or relevance to the current threat hunting objectives. Accordingly, in some embodiments, threat hunting engines may be arranged to prioritize evidence sources based on investigation scope, threat intelligence indicators, attack pattern signatures, historical effectiveness, or the like. In some embodiments, threat hunting engines may be arranged to validate evidence source connectivity, authentication requirements, data format compatibility, collection permissions, or the like before initiating evidence gathering operations. In some embodiments, threat hunting engines may be configured to dynamically adjust evidence source selection based on real-time availability, performance metrics, data volume considerations, or resource constraints.

At block 1106, in one or more of the various embodiments, threat hunting engines may be arranged to generate or execute one or more collection instructions for gathering candidate evidence from the one or more evidence sources.

In some embodiments, threat hunting engines may be arranged to create collection instructions that specify data extraction parameters, time ranges, filtering criteria, sampling rates, data transformation requirements, or the like. In some embodiments, collection instructions may include API calls, database queries, file system operations, network packet captures, log parsing directives, or the like tailored to specific evidence source types. Accordingly, in some embodiments, threat hunting engines may be configured to generate collection instructions that optimize performance by implementing parallel processing, batch operations, incremental collection, caching strategies, or the like. In some embodiments, threat hunting engines may be arranged to incorporate security controls within collection instructions, including authentication tokens, encryption parameters, access logging, audit trail generation, or the like. In some embodiments, collection instructions may include error handling procedures, retry mechanisms, timeout configurations, resource limitation constraints, or the like to ensure robust evidence gathering operations.

At block 1108, in one or more of the various embodiments, threat hunting engines may be arranged to collect candidate evidence from the one or more evidence sources.

In some embodiments, threat hunting engines may be arranged to execute collection instructions across multiple evidence sources simultaneously, coordinating data gathering operations to maintain temporal coherence, avoid resource conflicts, or optimize collection efficiency. In some embodiments, candidate evidence collection may include retrieving log entries, network traffic samples, file system artifacts, registry entries, memory dumps, process information, or the like from target evidence sources. Accordingly, in some embodiments, threat hunting engines may be configured to apply real-time filtering, deduplication, normalization, correlation, or enrichment processes during evidence collection to improve data quality. In some embodiments, threat hunting engines may be arranged to monitor collection progress, resource utilization, error rates, data volume metrics, or the like to ensure successful evidence gathering operations. Thus, in some embodiments, threat hunting engines may be configured to store collected candidate evidence in temporary repositories, evidence databases, or structured data formats for subsequent analysis, investigation, or threat assessment activities.

Next, in one or more of the various embodiments, control may be returned to a calling process.

Figure 12:
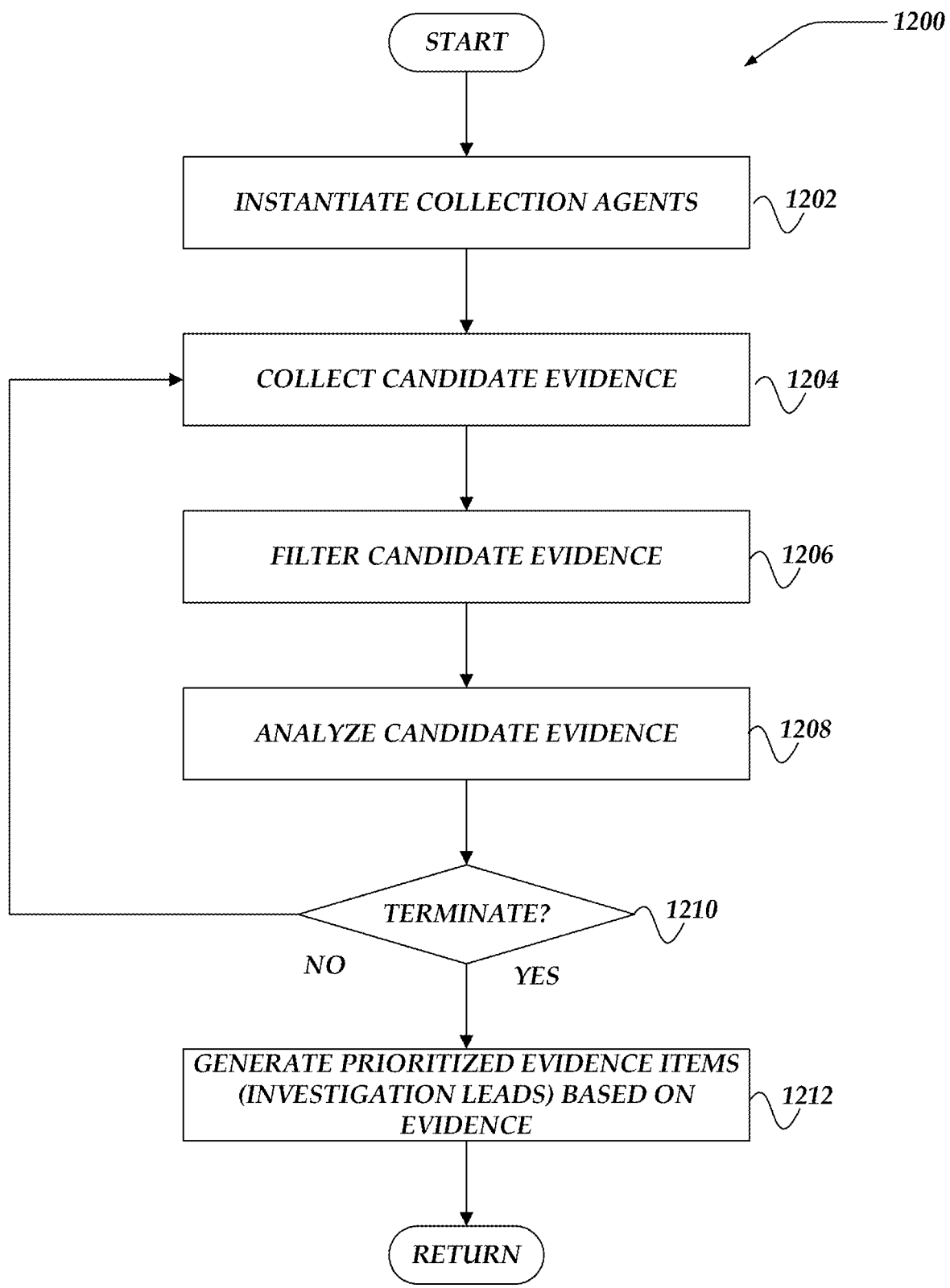
FIG. 12 illustrates a flowchart of a process for automated threat hunting in accordance with one or more of the various embodiments.

FIG. 12 illustrates a flowchart of process 1200 for automated threat hunting in accordance with one or more of the various embodiments. After a start block, at block 1202, in one or more of the various embodiments, threat hunting engines may be arranged to instantiate one or more collection agents.

In some embodiments, threat hunting engines may be arranged to create specialized collection agents based on evidence source types, threat hunting plan requirements, investigation scope parameters, resource availability constraints, or the like. In some embodiments, collection agents may be configured with specific capabilities for interfacing with security information and event management systems, file systems, network monitoring tools, database systems, cloud platforms, or the like. Accordingly, in some embodiments, threat hunting engines may be configured to scale agent deployment based on evidence volume estimates, collection complexity requirements, performance optimization goals, parallel processing capabilities, or the like. In some embodiments, threat hunting engines may be arranged to assign collection agents to particular evidence sources, data categories, temporal ranges, entity types, geographic regions, or the like to optimize evidence gathering efficiency. In some embodiments, collection agents may be provisioned with authentication credentials, access permissions, configuration parameters, collection templates, error handling procedures, or the like to enable autonomous evidence gathering operations.

At block 1204, in one or more of the various embodiments, threat hunting engines may be arranged to use the one or more agents to collect the candidate evidence.

In some embodiments, collection agents may be arranged to execute evidence gathering operations across multiple evidence sources simultaneously, implementing coordinated collection strategies to maintain data integrity, temporal consistency, or investigation coherence. In some embodiments, agents may be configured to retrieve system logs, network traffic captures, endpoint forensics data, user activity records, application traces, configuration files, or the like based on threat hunting plan specifications.

Accordingly, in some embodiments, threat hunting engines may be arranged to monitor agent performance metrics, collection progress indicators, resource utilization rates, error frequencies, data quality measures, or the like to ensure effective evidence gathering operations. In some embodiments, collection agents may be configured to apply preliminary filtering, data normalization, format standardization, duplicate detection, or relevance scoring during evidence collection to optimize subsequent processing operations. In some embodiments, agents may be arranged to implement collection throttling, resource management, retry mechanisms, failover procedures, or the like to maintain system stability while maximizing evidence collection effectiveness.

At block 1206, in one or more of the various embodiments, threat hunting engines may be arranged to filter the candidate evidence.

In some embodiments, threat hunting engines may be arranged to apply evidence quality filters based on source reliability metrics, temporal relevance criteria, data completeness indicators, format consistency requirements, or the like to eliminate irrelevant or unreliable candidate evidence.

In some embodiments, filtering operations may include removing duplicate records, corrupted data entries, incomplete evidence items, format inconsistencies, or temporal anomalies from the candidate evidence collection. Accordingly, in some embodiments, threat hunting engines may be configured to implement filtering algorithms that preserve critical threat indicators while reducing evidence volume, maintaining investigation focus, or optimizing analysis efficiency. In some embodiments, evidence filtering may include entity resolution processes, alias detection mechanisms, relationship identification algorithms, pattern matching operations, or the like to consolidate related evidence items. In some embodiments, threat hunting engines may be arranged to apply threat hunting plan-specific filtering criteria, investigation scope limitations, regulatory compliance requirements, or organizational policy constraints during evidence processing operations.

At block 1208, in one or more of the various embodiments, threat hunting engines may be arranged to evaluate the candidate evidence to identify evidence items.

In some embodiments, threat hunting engines may be arranged to analyze filtered candidate evidence using threat intelligence indicators, behavioral analysis algorithms, anomaly detection methods, pattern recognition techniques, or the like to identify evidence items with potential threat relevance. In some embodiments, evidence evaluation may include calculating relevance scores, confidence ratings, threat indicators, behavioral anomaly metrics, or investigation priority levels for individual evidence items. Accordingly, in some embodiments, threat hunting engines may be configured to apply machine learning classifiers, statistical analysis methods, heuristic evaluation techniques, correlation algorithms, or the like to assess evidence significance within the current threat hunting context. In some embodiments, evidence evaluation processes may include cross-referencing evidence items against known attack patterns, threat actor signatures, compromise indicators, vulnerability databases, or the like to determine investigation value. Thus, in some embodiments, threat hunting engines may be arranged to generate evidence item data structures that include evidence content, metadata attributes, source attribution, temporal information, entity associations, or the like to support subsequent threat analysis operations.

At decision block 1210, in one or more of the various embodiments, if the collection action may be terminated, control may flow to block 1212; otherwise, control may loop back to block 1204.

In some embodiments, threat hunting engines may be arranged to evaluate collection termination criteria based on evidence volume thresholds, investigation time limits, resource consumption constraints, evidence quality metrics, or the like to determine if additional evidence collection is required. In some embodiments, termination decisions may be based on threat hunting plan completion status, investigation objective achievement, evidence sufficiency indicators, resource availability limitations, or the like. Accordingly, in some embodiments, threat hunting engines may be configured to implement adaptive collection strategies that continue evidence gathering until sufficient investigative material has been obtained or predetermined collection limits have been reached.

At block 1212, in one or more of the various embodiments, threat hunting engines may be arranged to generate prioritized evidence items (investigation leads) based on the collected evidence.

In some embodiments, threat hunting engines may be arranged to rank evidence items based on threat relevance scores, investigation priority levels, evidence quality metrics, temporal significance indicators, or the like to create prioritized investigation leads for subsequent threat analysis. In some embodiments, prioritization algorithms may consider threat intelligence correlations, attack pattern similarities, behavioral anomaly severity, compromise indicator strength, or the like to establish investigation sequences. Accordingly, in some embodiments, threat hunting engines may be configured to organize prioritized evidence items into investigation lead categories, threat vector groupings, entity-based clusters, temporal sequences, or the like to facilitate systematic threat hunting analysis.

In some embodiments, investigation leads may include evidence item summaries, threat context information, recommended investigation approaches, analysis priority indicators, or the like to guide subsequent threat assessment activities. Thus, in some embodiments, threat hunting engines may be arranged to generate investigation lead data structures that preserve evidence provenance, maintain analytical context, support investigation traceability, or enable efficient threat hunting workflows.

Next, in one or more of the various embodiments, control may be returned to a calling process.

Figure 13:
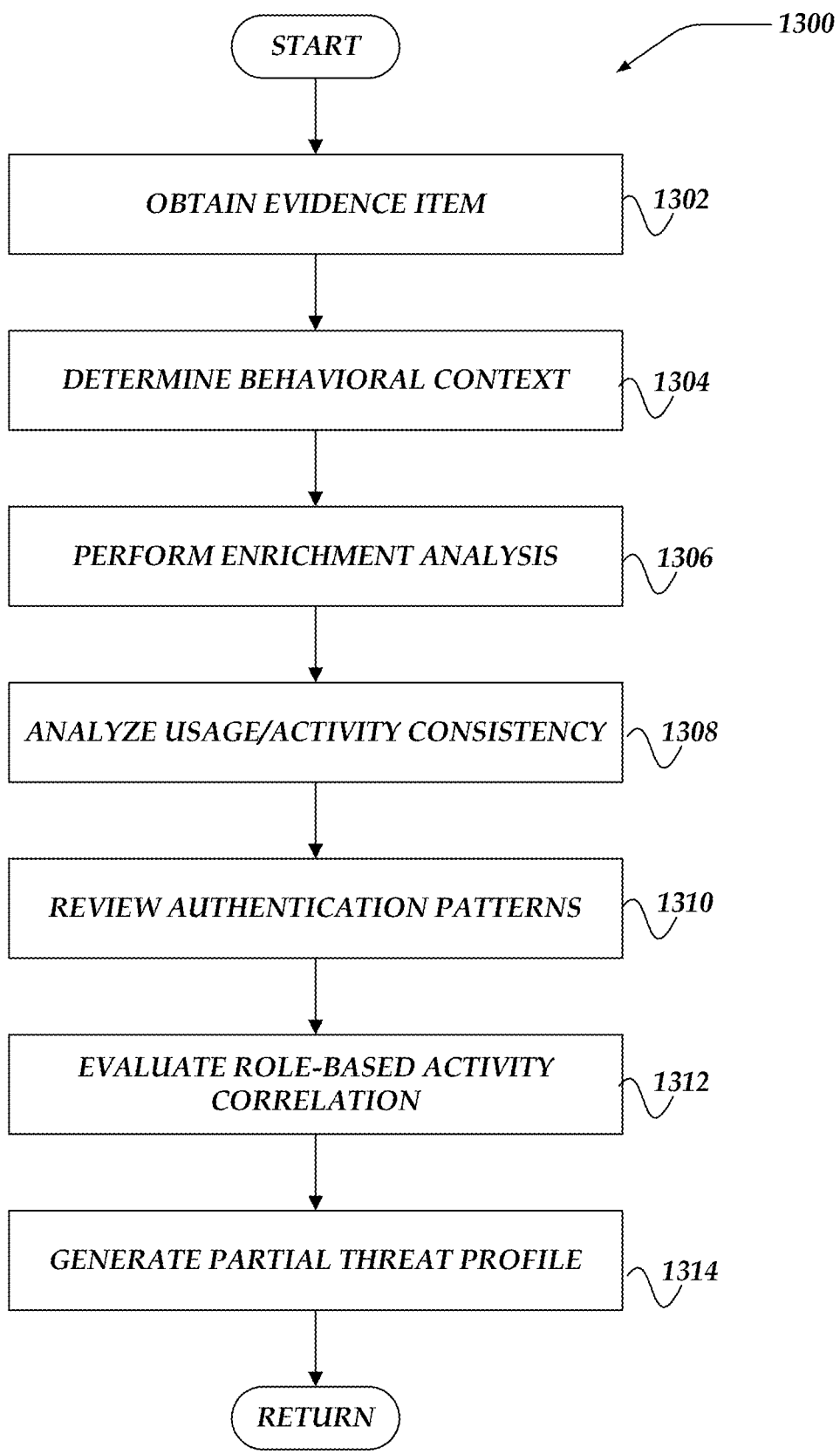
FIG. 13 illustrates a flowchart of a process for automated threat hunting in accordance with one or more of the various embodiments.

FIG. 13 illustrates a flowchart of process 1300 for automated threat hunting in accordance with one or more of the various embodiments. After a start block, at block 1302, in one or more of the various embodiments, threat hunting engines may be arranged to obtain evidence items.

In some embodiments, threat hunting engines may be arranged to retrieve evidence items from prioritized investigation leads generated during evidence collection processes, including evidence content, metadata attributes, source attribution, temporal information, entity associations, or the like.

Accordingly, in some embodiments, threat hunting engines may be configured to validate evidence item integrity, completeness, format consistency, or temporal accuracy before initiating detailed threat analysis operations. In some embodiments, evidence item retrieval may include accessing related evidence items, correlated data sources, historical investigation records, threat intelligence feeds, or the like to establish comprehensive analytical context. In some embodiments, threat hunting engines may be arranged to apply evidence item selection criteria, investigation scope limitations, regulatory compliance requirements, or organizational policy constraints during evidence retrieval operations.

At block 1304, in one or more of the various embodiments, threat hunting engines may be arranged to determine the behavioral context associated with the evidence item.

In some embodiments, threat hunting engines may be arranged to analyze evidence items to establish behavioral baselines, usage patterns, activity sequences, temporal relationships, or environmental contexts that characterize normal operations within the monitored environment. In some embodiments, behavioral context analysis may include examining user activity patterns, application usage behaviors, network communication patterns, system resource utilization, or access control interactions associated with the evidence item. Accordingly, in some embodiments, threat hunting engines may be configured to correlate evidence item behaviors with historical activity data, organizational policies, role-based expectations, geographic constraints, or temporal limitations to identify potential anomalies. In some embodiments, behavioral context determination may employ statistical analysis methods, machine learning algorithms, pattern recognition techniques, anomaly detection mechanisms, or the like to establish context-aware threat assessment frameworks. In some embodiments, threat hunting engines may be arranged to generate behavioral profiles, activity summaries, pattern classifications, or contextual annotations that support subsequent threat analysis operations.

At block 1306, in one or more of the various embodiments, threat hunting engines may be arranged to perform enrichment analysis.

In some embodiments, threat hunting engines may be arranged to enhance evidence items with supplemental information from threat intelligence platforms, vulnerability databases, security vendor feeds, incident response repositories, or the like to provide comprehensive threat assessment context. In some embodiments, enrichment analysis may include cross-referencing evidence items against known compromise indicators, attack signatures, malware patterns, threat actor profiles, or the like to identify potential security implications. Accordingly, in some embodiments, threat hunting engines may be configured to integrate external threat intelligence, internal security policies, organizational risk assessments, compliance requirements, or the like to establish enriched analytical frameworks. In some embodiments, enrichment processes may include geolocation analysis, reputation scoring, risk categorization, confidence rating, or temporal correlation to augment evidence item analytical value. Thus, in some embodiments, threat hunting engines may be arranged to generate enriched evidence items that include threat correlations, risk indicators, contextual annotations, or intelligence attributions to support comprehensive threat assessment operations.

At block 1308, in one or more of the various embodiments, threat hunting engines may be arranged to analyze usage or activity consistency associated with the evidence item.

In some embodiments, threat hunting engines may be arranged to evaluate evidence items for consistency with established usage patterns, organizational policies, role-based expectations, temporal constraints, or environmental norms to identify potential anomalies or suspicious activities. In some embodiments, consistency analysis may include comparing evidence item characteristics against baseline behaviors, authorized activities, permitted access patterns, approved application usage, or the like to detect deviations. Accordingly, in some embodiments, threat hunting engines may be configured to apply one or more consistency evaluation algorithms that consider user roles, geographic locations, time zones, business processes, or organizational hierarchies to assess activity appropriateness. In some embodiments, usage consistency analysis may employ statistical variance detection, behavioral deviation scoring, pattern matching algorithms, rule-based evaluation, or the like to identify potentially threatening activities. In some embodiments, threat hunting engines may be arranged to generate consistency scores, deviation metrics, anomaly indicators, or violation flags that quantify evidence item alignment with expected organizational behaviors.

At block 1310, in one or more of the various embodiments, threat hunting engines may be arranged to review authentication patterns associated with the evidence item.

In some embodiments, threat hunting engines may be arranged to analyze one or more of authentication events, access control decisions, credential usage patterns, session management activities, authorization sequences, or the like associated with evidence items to identify potential security concerns. In some embodiments, authentication pattern analysis may include examining login frequencies, access timing patterns, credential sharing indicators, multi-factor authentication usage, session duration characteristics, or the like to detect anomalous behaviors. Accordingly, in some embodiments, threat hunting engines may be configured to correlate authentication patterns with user roles, geographic locations, device characteristics, network contexts, temporal constraints, or the like to identify potential threats.

In some embodiments, authentication review processes may include evaluating failed authentication attempts, privilege escalation events, concurrent session activities, unusual access patterns, or the like that may indicate compromised credentials or unauthorized access. In some embodiments, threat hunting engines may be arranged to generate authentication assessments, access risk scores, credential usage summaries, security violation indicators, or the like that support evidence evaluation operations.

At block 1312, in one or more of the various embodiments, threat hunting engines may be arranged to evaluate role-based activity correlations associated with the evidence item.

In some embodiments, threat hunting engines may be arranged to analyze evidence items within the context of user roles, organizational responsibilities, departmental functions, access privileges, business process requirements, or the like to identify activities that may be inconsistent with authorized roles. In some embodiments, role-based evaluation may include comparing evidence item activities against job function expectations, departmental policies, access control matrices, privilege assignments, or the like to detect potential insider threats or compromised accounts. Accordingly, in some embodiments, threat hunting engines may be configured to correlate evidence item activities with organizational hierarchies, reporting structures, project assignments, geographic locations, or temporal work patterns to assess role appropriateness. In some embodiments, role-based correlation analysis may employ organizational modeling algorithms, privilege analysis methods, access pattern evaluation, or behavioral profiling techniques to identify potential security risks. Thus, in some embodiments, threat hunting engines may be arranged to generate role compliance scores, privilege violation indicators, organizational risk assessments, or insider threat metrics that quantify evidence item risk/threat alignment with authorized organizational activities.

At block 1314, in one or more of the various embodiments, threat hunting engines may be arranged to generate a partial threat profile based on the evidence item.

In some embodiments, threat hunting engines may be arranged to synthesize behavioral context, enrichment analysis, consistency evaluation, authentication review, role-based correlation results, or the like to create threat assessment profiles for individual evidence items. In some embodiments, partial threat profiles may include threat severity ratings, confidence scores, risk indicators, evidence correlations, or recommended investigation actions based on the analytical findings. Accordingly, in some embodiments, threat hunting engines may be configured to format partial threat profiles with standardized threat classifications, evidence summaries, analytical methodologies, or investigation recommendations to support subsequent threat hunting operations. In some embodiments, partial threat profile generation may include aggregating threat indicators, correlating evidence relationships, calculating composite risk scores, or establishing investigation priorities based on organizational security policies. In some embodiments, threat hunting engines may be arranged to store partial threat profiles in investigation repositories, threat assessment databases, or analytical frameworks for subsequent consolidation, correlation, or reporting activities.

Next, in one or more of the various embodiments, control may be returned to a calling process.

Figure 14:
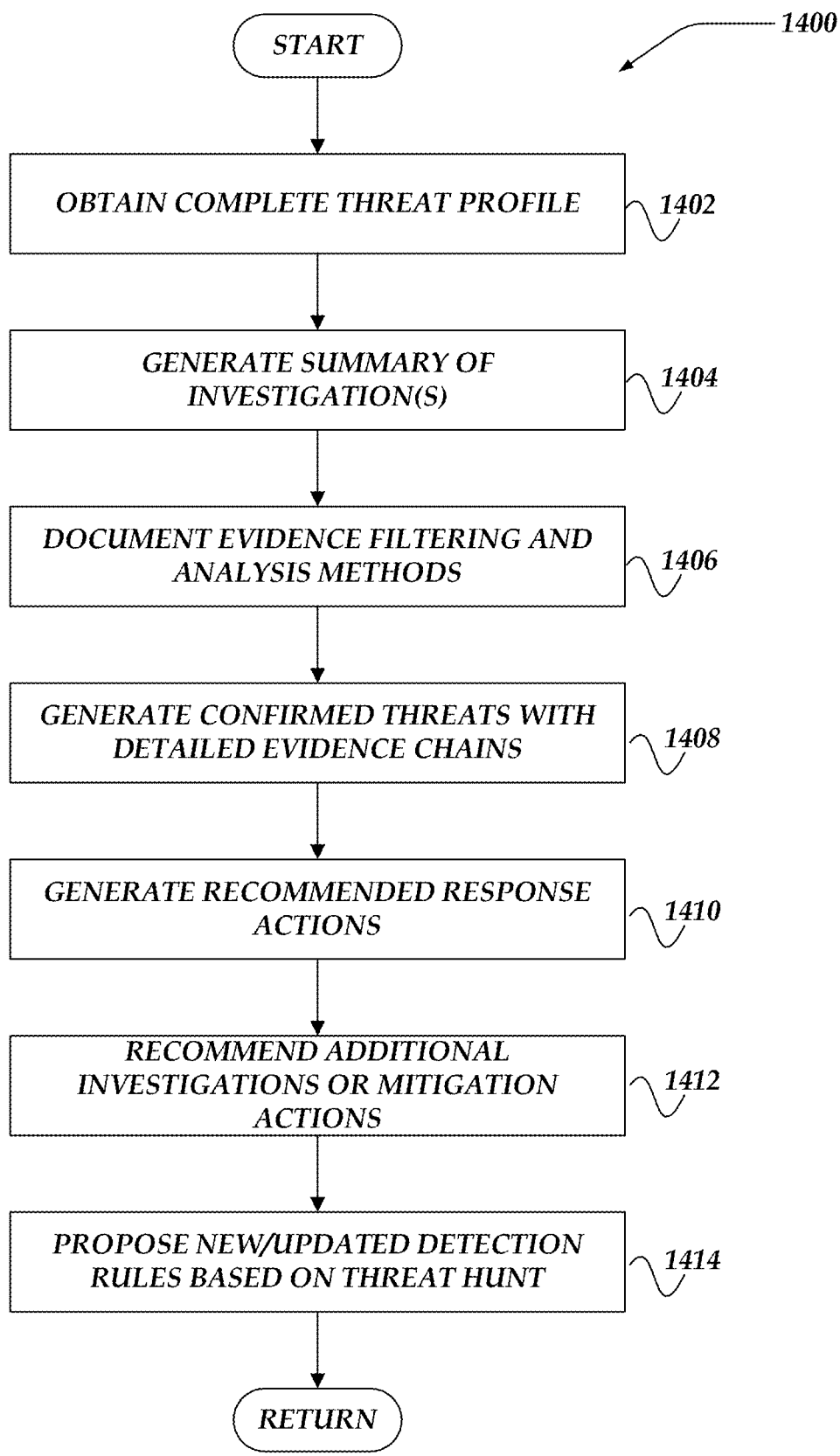
FIG. 14 illustrates a flowchart of a process for automated threat hunting in accordance with one or more of the various embodiments.

FIG. 14 illustrates a flowchart of process 1400 for automated threat hunting in accordance with one or more of the various embodiments. After a start block, at block 1402, in one or more of the various embodiments, threat hunting engine may be arranged to obtain a completed threat profile.

In some embodiments, threat hunting engines may be arranged to consolidate partial threat profiles from individual evidence item analyses into comprehensive threat assessment documents that synthesize investigation findings, risk evaluations, or threat intelligence correlations. In some embodiments, completed threat profiles may include threat severity classifications, confidence indicators, attack vector summaries, affected entity lists, or temporal analysis results based on comprehensive evidence evaluation. Accordingly, in some embodiments, threat hunting engines may be configured to validate threat profile completeness by ensuring all investigation leads have been analyzed, evidence chains have been established, or threat indicators have been properly correlated. In some embodiments, threat profile completion may include calculating composite risk scores, determining threat persistence indicators, establishing attack progression timelines, or identifying potential impact assessments. In some embodiments, threat hunting engines may be arranged to format completed threat profiles using standardized threat classification schemas, industry-standard frameworks, organizational reporting templates, or regulatory compliance requirements.

At block 1404, in one or more of the various embodiments, threat hunting engines may be arranged to generate a summary of the investigative operations that were executed.

In some embodiments, threat hunting engines may be arranged to create comprehensive operational summaries that document investigation methodologies, evidence collection strategies, analysis techniques, agent deployment patterns, resource utilization metrics, or the like that may have been employed during threat hunting activities. In some embodiments, investigative operations summaries may include evidence source coverage statistics, collection agent performance metrics, analysis algorithm effectiveness ratings, investigation timeline documentation, or the like. Accordingly, in some embodiments, threat hunting engines may be configured to generate investigative reports that detail investigation scope parameters, threat hunting plan execution status, evidence processing volumes, analytical workflow progression, or the like. In some embodiments, threat hunting engines may be arranged to format investigative operation summaries for various audiences, including technical analysts, management stakeholders, compliance reviewers, or external auditors.

At block 1406, in one or more of the various embodiments, threat hunting engines may be arranged to document the evidence filtering or analysis methods used during the investigation.

In some embodiments, threat hunting engines may be arranged to create detailed documentation that describes evidence filtering criteria, analysis algorithms, threat correlation techniques, evaluation frameworks, or the like that may have been applied during investigation operations. In some embodiments, methodology documentation may include filter configuration parameters, correlation rule definitions, evaluation threshold settings, or the like that may have been employed during automated threat hunting.

Accordingly, in some embodiments, threat hunting engines may be arranged to generate analytical method reports that enable investigation reproducibility, peer review validation, audit trail establishment for compliance purposes, or the like. In some embodiments, method documentation may include the rationale or justifications for one or more analytical choices, performance metrics for evaluation techniques, effectiveness assessments for filtering strategies, or the like. Thus, in some embodiments, threat hunting engines may be arranged to create structured documentation that supports investigation transparency, methodological validation, or organizational knowledge preservation for future threat hunting activities.

At block 1408, in one or more of the various embodiments, threat hunting engines may be arranged to generate one or more confirmed threats with detailed evidence chains.

In some embodiments, threat hunting engines may be arranged to produce threat descriptions that may include comprehensive evidence documentation, attack vector descriptions, compromise indicator summaries, threat actor attribution analysis based on investigation findings, or the like. In some embodiments, confirmed threat generation may include establishing evidence provenance chains, correlation documentation, analytical reasoning explanations, or the like that may support the threat conclusions. Accordingly, in some embodiments, threat hunting engines may be arranged to format confirmed threats using one or more standardized threat intelligence formats, incident response frameworks, threat classification systems, or the like. In some embodiments, threat confirmation may include calculating confidence scores, establishing threat persistence indicators, documenting potential impact assessments for affected organizational assets, or the like. Also, in some embodiments, threat hunting engines may be arranged to generate confirmed threat reports that include remediation urgency indicators, affected system inventories, threat progression timelines for incident response coordination, or the like.

At block 1410, in one or more of the various embodiments, threat hunting engines may be arranged to generate one or more recommended response actions based on the threats.

In some embodiments, threat hunting engines may be arranged to create actionable response recommendations that may include immediate containment measures, threat mitigation strategies, system hardening procedures, incident response escalation protocols, or the like based on confirmed threat assessments. Also, in some embodiments, response action generation may include prioritizing recommendations based on threat severity, implementation complexity, resource requirements, organizational impact considerations, or the like.

Accordingly, in some embodiments, threat hunting engines may be configured to format response recommendations using one or more standard or custom incident response procedures, industry best practices, regulatory compliance frameworks, or the like. In some embodiments, recommended actions may include automated response triggers, manual intervention procedures, or coordination requirements with external security services. In some embodiments, threat hunting engines may be arranged to generate response action timelines, resource allocation estimates, or success measurement criteria for recommended mitigation activities.

At block 1412, in one or more of the various embodiments, threat hunting engines may be arranged to recommend one or more additional investigations or mitigation actions.

In some embodiments, threat hunting engines may be arranged to identify follow-up investigation opportunities, expanded threat hunting scope recommendations, related security assessment proposals, or the like based on current investigation findings. In some embodiments, additional investigation recommendations may include suggesting complementary threat hunting plans, proposing expanded evidence collection activities, identifying related threat vectors, or the like that may require separate analysis or investigation.

Also, in some embodiments, mitigation action recommendations may include preventive security measures, monitoring enhancement suggestions, policy update proposals, or the like that may be directed to one or more identified vulnerabilities. Thus, in some embodiments, threat hunting engines may be arranged to create follow-up action plans that may support continuous security improvement, threat landscape adaptation, organizational resilience enhancement initiatives, or the like.

At block 1414, in one or more of the various embodiments, threat hunting engines may be arranged to propose one or more new or updated detection rules or processes based on the results of the threat hunt.

In some embodiments, threat hunting engines may be arranged to generate detection rule recommendations that incorporate threat indicators, attack patterns, behavioral anomalies, or the like that may be discovered during the threat hunt into automated monitoring systems. In some embodiments, detection rule proposals may include signature definitions, behavioral analysis parameters, correlation logic specifications, alert threshold configurations, or the like based on investigation results (threat profiles).

In some cases, in some embodiments, threat hunting engines may be configured to format detection rules for integration with security information and event management systems, intrusion detection platforms, endpoint protection services, or the like. In some embodiments, process improvement recommendations may include threat hunting plan updates, evidence collection enhancements, analysis methodology refinements, or the like that may be based on threat hunt results. Also, in some embodiments, threat hunting engines may be arranged to generate implementation guidance, testing procedures, performance monitoring recommendations, or the like for proposed detection rules or process improvements.

Next, in one or more of the various embodiments, control may be returned to a calling process.

Figure 15:
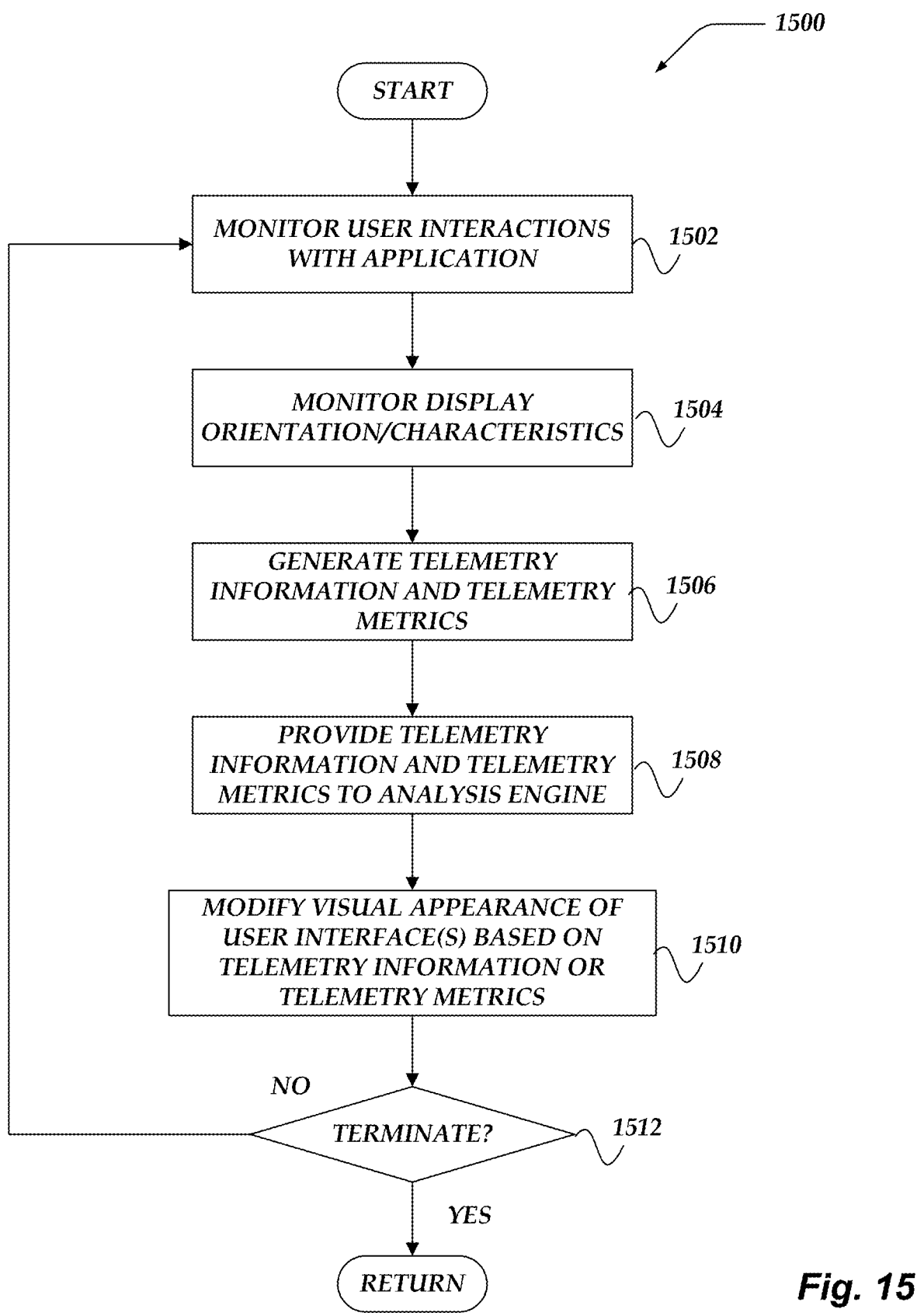
FIG. 15 illustrates a flowchart of a process for collecting and applying telemetry information and telemetry metrics for automated threat hunting in accordance with one or more of the various embodiments.

FIG. 15 illustrates a flowchart of process 1500 for collecting and applying telemetry information and telemetry metrics for automated threat hunting in accordance with one or more of the various embodiments. After a start block, at block 1502, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 4 for additional details.

At block 1504, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 1506, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1508, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as analysis engines, threat hunting engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At block 1510, in one or more of the various embodiments, analysis engines or threat hunting engines may be arranged to modify the visual appearance of one or more user interfaces based on the telemetry information or telemetry metrics.

Accordingly, in some embodiments, analysis engines or threat hunting engines may be arranged to dynamically change the visual appearance of the one or more user interfaces to improve the efficiency and effectiveness of the user interfaces based on some or all of the telemetry information or telemetry metrics. For example, analysis engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, analysis engines may be arranged to highlight or size the preferred user interface elements or display panels. For example, if users are determined to rarely interact with a particular display panel, analysis engines may be arranged to reduce the size, diminish the shape, disable its controls, and reposition that display panel to improve the efficiency of display screen usage. See, also FIG. 4 and its description.

At decision block 1512, in one or more of the various embodiments, if the telemetry engine, analysis engine, or threat hunting engine may be terminated, control may be returned to a calling process; otherwise, control may loop back to block 1502. In some embodiments, telemetry engines may be arranged to continuously or periodically provide updated/current telemetry information or telemetry metrics to enable analysis engines or threat hunting engines to dynamically change the visual appearance of the one or more user interfaces. Accordingly, in some embodiments, process 1500 may continue operation until it may be explicitly terminated or the operation of the associated analysis engines or threat hunting engines may be terminated.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Figure 16:
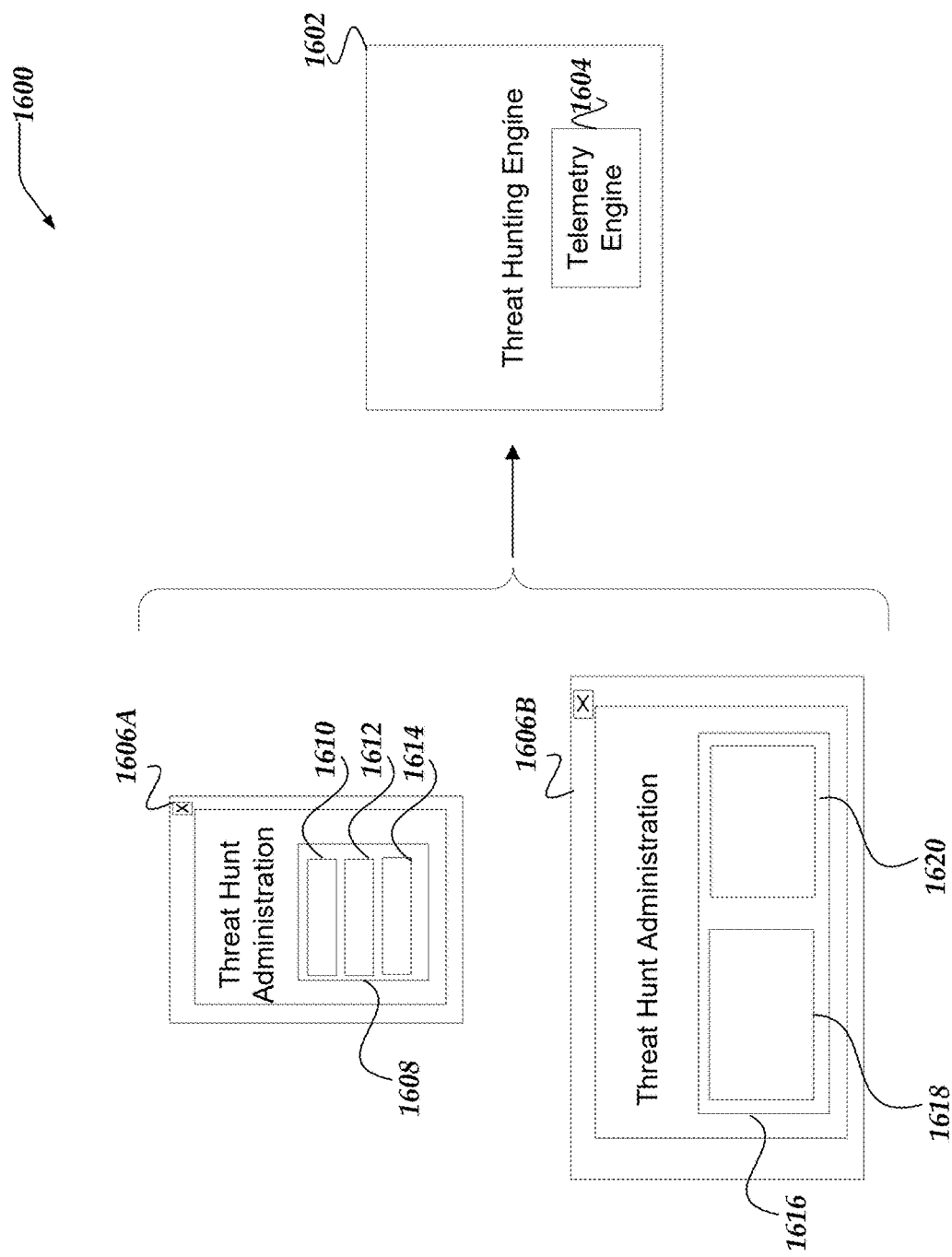
FIG. 16 illustrates a logical schematic of a system for collecting and applying telemetry information and telemetry metrics for automated threat hunting in accordance with one or more of the various embodiments.

FIG. 16 illustrates a logical schematic of system 1600 for collecting and applying telemetry information and telemetry metrics for context repository management in accordance with one or more of the various embodiments. System 1600 may comprise various constituents, including: threat hunting engine 1602; telemetry engine 1604; one or more client user interfaces, such as user interface 1606 (A or B); or the like.

As described above, in some embodiments, threat hunting engines, such as threat hunting engine 1602 may be arranged to perform actions to support the operation, organization, or management of threat hunts.

Further, in some embodiments, systems, such as system 1600 may include one or more telemetry engines, such as telemetry engine 1604. In some embodiments, telemetry engines may be arranged to monitor or evaluate interactions with applications or user interfaces such as user interface 1606A, user interface 1606B, or the like. In some embodiments, this may include monitoring how users or even other applications may interact with user interfaces, interactive reports, various applications, or one or more system features. Note, in this example, for some embodiments, user interface 1606A may represent the presentation or display of a user interface in a first adapted arrangement while user interface 1606B may represent the present of display of the same user interface having a second adapted arrangement. For example, for some embodiments, user interface 1606A may be the user interface displayed in portrait mode while the user interface 1606B may be considered to be the user interface in landscape mode after a hardware display has been rotated.

In some embodiments, user interfaces, such as user interface 1606A or user interface 1606B may include various windows, controls, or other user interface features. In some embodiments, user interfaces may include various user interface panels, such as panel 1608, panel 1616, or the like. For example, in some embodiments, panel 1608, or the like may represent a user interface that enables users, such as security analysts, to review threat hunt information or perform threat hunt administration displayed in a portrait (vertical) orientation while user interface 1606B may represent threat hunting information displayed in a landscape (horizontal) orientation. Further, in some embodiments, element 1610, element 1612, element 1614, element 1618, element 1620, or the like may be considered to represent various user interface elements, controls, buttons, list items, report features, user interface components, displayed content, formatted content, or the like that may be included in user interfaces.

Also, for example, for some embodiments, user interface 1606A or 1606B may be considered a user interface that enables administrative users to work with threat hunt plans, or the like. For example, panel 1608 may be used to select, generate, or modify threat hunt plans, evidence repositories, queries, or the like. For example, display panel 1608 may be used to display quality or effectiveness rankings for one or more threat hunting plans sorted based on inferred importance, value, or the like. Likewise, in some embodiments, panels such as panel 1608 may be used to display evidence repository schema information, evidence items, candidate evidence items, display reports regarding evidence item records and their relevance to pending or previous incident investigations or threat hunts, or the like.

In some embodiments, threat hunting engines, such as threat hunting engine 1602 (as well as analysis engines, telemetry engines, ingestion engines, or the like) may be arranged to generate or display user interfaces, such as user interface 1606A or user interface 1606B to users using one or more of video interface 242, projector 246, display 250, or the like, of a client computer, such as client computer 200. Similarly, in some embodiments, analysis engine 402, threat hunting engine 430, or ingestion engine 404 may be arranged to generate or display user interface 432, user interface 436, or the like to users using a one or more of input/output interface 338, display 350, audio interface 356, or the like, of a network computer, such as network computer 300.

In some embodiments, threat hunting engines, such as threat hunting engine 1602 (as well as analysis engines, telemetry engines, ingestion engines, or the like) may be arranged to collect various telemetry or other metrics associated with user interactions with user interfaces. In some embodiments, telemetry may include tracking or monitoring if users may be in agreement with evidence items, threat hunt plans, report arrangement/organization, or the like. In some embodiments, threat hunting engines, or the like may be enabled to employ telemetry information or telemetry metrics collected or determined by telemetry engines, such as telemetry engine 1604. In some embodiments, telemetry engines may be separate from analysis engines, threat hunting engines, ingestion engines, or the like as shown in FIG. 4. Also, in some embodiments, telemetry engines may be part of or otherwise embedded in analysis engines, threat hunting engines, ingestion engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, analysis engines, threat hunting engines, ingestion engines, or the like may be arranged to monitor telemetry information associated with one or more users.

Accordingly, in some embodiments, analysis engines, threat hunting engines, ingestion engines, or the like may be arranged to provide one or more user interface facilities to collect direct feedback from one or more of the users that may interact with information displayed in the one or more user interfaces. For example, in some embodiments, user interfaces may include controls that enable authorized users to grade one or more evidence reports, candidate evidence sets, threat hunt profiles, or the like.

In some embodiments, grades or scores may be binary (e.g., like/dislike), discrete (e.g., one-four stars, letter grades), continuous values, or the like.

Also, in one or more of the various embodiments, analysis engines, threat hunting engines, ingestion engines, or the like may be arranged to provide user interfaces that monitor how users interact with input information, events, event reports, recommend resolution actions, or the like. In some embodiments, telemetry information employed to monitor user preferences may be based on monitoring user interactions as well as direct feedback. Accordingly, in some embodiments, input information, threat hunt plans, candidate evidence items, or the like, that may appear well-formed but are ignored or discarded by users may be inferred to be poorly received. For example, for some embodiments, if the top ranked results provided in response to user actions, user queries, or the like, are ignored or lower ranked results are favored by users, it may be inferred that there may be a problem with the data or the display of the data.

Further, in some embodiments, threat hunting engines, or the like may be arranged to receive telemetry information from other services or applications. Accordingly, in one or more of the various embodiments, threat hunting engines, or the like may not be required to directly monitor activity associated with the input information, candidate evidence items, threat hunt plans, threat hunt reports, recommend resolution actions, or the like. For example, for some embodiments, user interfaces, such as user interface 1606A or user interface 1606B may be displayed to users via desktop computer applications, mobile applications, web-based applications, or the like. In some embodiments, such applications may collect the telemetry information and provide some or all it to analysis engines, threat hunting engines, ingestion engines, or the like rather than requiring the analysis engines, threat hunting engines, ingestion engines, or the like to include monitoring facilities on user-facing applications.

Accordingly, in some embodiments, threat hunting engine 1602, or the like may be arranged to collect metrics or telemetry associated with user interactions with user interface 1606A or user interface 1606B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, threat hunting engine 1602, or the like may be arranged to collect metrics or telemetry associated with user interactions with user interface 1606A, or user interface 1606B using a one or more of input/output interface 338, GPS 340, keyboard 352, audio interface 356, pointing device interface 358, or the like, of a network computer, such as network computer 300.

In some embodiments, threat hunting engines, or the like may be arranged to track mouse movement, eye movement, keystrokes, or the like, to determine how users may interact with information (e.g., input information, events, event reports, candidate evidence items, evidence items, recommended resolution actions, or the like) displayed in user interfaces. Accordingly, in some embodiments, threat hunting engines, or the like may be arranged to evaluate at least the quality of various investigation recommendations, evidence selection, report characteristics, or the like based on how users interact with them via the user interfaces. For example, if users consistently select or otherwise favor interacting with items or candidate evidence items ranked lower than others, it may indicate that one or more models performing the ranking or item selection may be experiencing diminished or diminishing effectiveness. Likewise, in some embodiments, users may reject or ignore report results, suggested actions, evidence suggestions, threat hunt conclusions, or the like which may indicate that one or more associated models or systems may be experiencing diminished or diminishing effectiveness.

In some embodiments, threat hunting engines, or the like may be arranged to associate a performance score with user interfaces used in the system based on the user interaction metrics or telemetry. Accordingly, in some embodiments, if the performance score associated with a user interface or user interface element falls below a defined threshold value, threat hunting engines, or the like may be arranged to suspend those user interfaces (or portions thereof) from operation. Or, in some embodiments, threat hunting engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, and the like. The dynamic transformation may include arrangement, re-arrangement, elimination, addition, or adaptation of content and visual elements in user interfaces and display panels based on at least the collected telemetry information.

Additionally, in some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, analysis engines, threat hunting engines, ingestion engines, or the like may dynamically change the visual appearance of the user interfaces to improve the efficiency and effectiveness of the system or its user interfaces for the user. Accordingly, in some embodiments, analysis engines, threat hunting engines, or ingestion engines may be arranged to dynamically select, position, size, shape, remove, hide, inactivate, disable, highlight, or style one or more visual user interface components such as display panels, controls, elements and content based on one or more of user telemetry metrics and user feedback. For example, if user interactions with the user interface are tracked focusing on or navigating to particular user interface views, components or user interface panels, system components, such as analysis engines, threat hunting engines, or ingestion engines may be arranged to dynamically highlight or size the preferred user interface elements and/or display panels. For example, if users are determined to rarely interact with a user interface element, such as element 1614, threat hunting engines, or the like may be arranged to dynamically reduce the size, diminish the shape, disable its controls, or re-position element 1614 by displaying a smaller sized greyed out version of element 1614 in its display panel.

Also, in some embodiments, threat hunting engines, or the like may be arranged to adapt user interfaces based on the size/type of display, input methods, user status, or the like. For example, in some embodiments, if a user is determined to be operating using a mobile device, one or more user interface elements may be dynamically positioned differently. In some cases, for some embodiments, depending on the display type or display size, one or more user interface elements may be hidden from view. For example, for some embodiments, a threat hunting engine may be arranged to dynamically modify or re-arrange user interface 1606A to obtain user interface 1606B based on telemetry associated with the display or associated user interactions. Accordingly, in this example, display panel 1616 may be considered to be dynamically modified or rearranged to accommodate the modified physical orientation of the display. Further, in this example, user interface 1606 now may be considered to display two elements (element 1618 and element 1620) rather than three elements as were displayed in user interface 1606A. Thus, in this example, threat hunting engine 1602 may display two elements for the landscape (horizontal) orientation instead of the three elements displayed in the portrait (vertical) orientation based on one or more telemetry metrics.

Accordingly, in some embodiments, threat hunting engines, or the like may be arranged to tangibly modify user interfaces, display panels, interactive reports, input collection, input selection, input data represent, evidence items, threat hunt plans, threat profiles, or the like, based on the efficient and effective performance of processes and/or activities associated with various types input information, events, evidence items, threat hunt plans, threat hunt results, or the like as determined by telemetry information, or the like.

What is claimed as new and desired to be protected by Letters Patent of the United States is:

1. A method for managing security in a computing environment using one or more processors to execute instructions that are configured to cause actions, comprising:

obtaining a threat hunt plan to collect a plurality of candidate evidence items from one or more evidence sources;

discarding one or more portions of the plurality of candidate evidence items based on a relevance score associated with each candidate evidence item;

collecting one or more evidence items based on one or more non-discarded portions of the plurality of candidate evidence items;

identifying one or more threat indicators associated with the one or more evidence items based on one or more criteria in the threat hunt plan;

obtaining one or more threat profiles based on the one or more evidence items and the one or more threat indicators, wherein the one or more threat profiles include one or more threat assessment metrics associated with the one or more threat indicators, and wherein the one or more threat profiles are included in a report; and obtaining a user interface that includes one or more display panels for content that includes the report and other information associated with the one or more threat assessments, wherein the content is dynamically transformed and arranged for display to a user based on one or more of user interaction telemetry, user feedback or telemetry metrics.

2. The method of claim 1, further comprises:
collecting threat intelligence data from one or more external threat sources including one or more of a security vendor advisory, a government alert, an industry threat report, or a vulnerability disclosure.

3. The method of claim 1, wherein collecting the one or more candidate evidence items, further comprises:
obtaining one or more collection agents to interface with one or more of a system log, a network traffic capture, an endpoint, a database, an email service, or a user activity record, wherein the one or more collection agents collect the plurality of candidate evidence items from the one or more evidence sources based on one or more of a time range, a filtering criterion, or a sampling rate.

4. The method of claim 1, further comprising:
obtaining the threat hunt plan from a threat hunt plan repository based on a threat hunt hypothesis, wherein the threat hunt plan includes one or more of an evidence collection strategy, an investigation methodology, an analysis framework, or a reporting requirement; and
modifying the threat hunt plan based on one or more of an organizational environment, an available evidence source, a security configuration, or a network architecture.

5. The method of claim 1, further comprising:
discarding one or more other portions of candidate evidence items of the plurality of candidate evidence items based on one or more filters that include one or more of a relevance filter, a quality filter, a format validator, or a duplicate detector; and
normalizing one or more of a data format, a timestamp format, an entity identifier, or a metadata structure associated with each non-discarded candidate evidence item.

6. The method of claim 1, further comprising:
obtaining one or more authentication actions associated with the one or more evidence items, wherein the one or more authentication actions include one or more of a login frequency, an access timing pattern, a credential usage pattern, or a session management activity; and
correlating the one or more authentication actions with one or more of a user role, a geographic location, a device characteristic, or a network context to identify one or more security concerns, wherein the one or more security concerns are included in the threat profile.

7. The method of claim 1, wherein obtaining the one or more threat profiles further comprises:
obtaining one or more metrics that include one or more of a threat severity rating, a confidence score, a risk indicator, or an evidence correlation that are associated with the one or more evidence items, wherein the one or more threat profiles include the one or more metrics.

8. The method of claim 1, further comprising:
detecting one or more threats, wherein one or more descriptions of the one or more detected threats include one or more of evidence documentation, an attack vector description, a compromise indicator summary, or a threat actor attribution analysis;
obtaining one or more response recommendations associated with the one or more threats including one or more of an immediate containment measure, a threat mitigation strategy, a system hardening procedure, or an incident response escalation protocol; and
updating the report to include the one or more descriptions and the one or more response recommendations.

9. The method of claim 1, further comprising:
obtaining one or more other response recommendations including one or more of a complementary threat hunting plan, an expanded evidence collection activity, a related threat vector analysis, or a continuous monitoring requirement; and
collecting one or more detection rule proposals that incorporate one or more of a discovered threat indicator, an attack pattern, a behavioral anomaly, or a compromise signature into one or more automated monitoring systems; and
updating the report to include the one or more other response recommendations and the one or more detection rule proposals.

10. The method of claim 1, further comprising:
obtaining a threat hunt hypothesis based on one or more of a user input, a scheduled task, or a notice associated with one or more potential security threats, wherein the threat hunt plan is based on the threat hunt hypothesis.

11. A network computer for managing security in a computing environment, comprising:
a memory that stores at least instructions; and
one or more processors that execute instructions that are configured to cause actions, including:
obtaining a threat hunt plan to collect a plurality of candidate evidence items from one or more evidence sources;
discarding one or more portions of the plurality of candidate evidence items based on a relevance score associated with each candidate evidence item;
collecting one or more evidence items based on one or more non-discarded portions of the plurality of candidate evidence items;
identifying one or more threat indicators associated with the one or more evidence items based on one or more criteria in the threat hunt plan;
obtaining one or more threat profiles based on the one or more evidence items and the one or more threat indicators, wherein the one or more threat profiles include one or more threat assessment metrics associated with the one or more threat indicators, and wherein the one or more threat profiles are included in a report; and
obtaining a user interface that includes one or more display panels for content that includes the report and other information associated with the one or more threat assessments, wherein the content is dynamically transformed and arranged for display to a user based on one or more of user interaction telemetry, user feedback or telemetry metrics.

12. The network computer of claim 11, wherein collecting the one or more candidate evidence items, further comprises:
obtaining one or more collection agents to interface with one or more of a system log, a network traffic capture, an endpoint, a database, an email service, or a user activity record, wherein the one or more collection agents collect the plurality of candidate evidence items from the one or more evidence sources based on one or more of a time range, a filtering criterion, or a sampling rate.

13. The network computer of claim 11, further comprising:
obtaining the threat hunt plan from a threat hunt plan repository based on a threat hunt hypothesis, wherein the threat hunt plan includes one or more of an evidence collection strategy, an investigation methodology, an analysis framework, or a reporting requirement; and
modifying the threat hunt plan based on one or more of an organizational environment, an available evidence source, a security configuration, or a network architecture.

14. The network computer of claim 11, further comprising:
discarding one or more other portions of candidate evidence items of the plurality of candidate evidence items based on one or more filters that include one or more of a relevance filter, a quality filter, a format validator, or a duplicate detector; and
normalizing one or more of a data format, a timestamp format, an entity identifier, or a metadata structure associated with each non-discarded candidate evidence item.

15. The network computer of claim 11, further comprising:
obtaining one or more authentication actions associated with the one or more evidence items, wherein the one or more authentication actions include one or more of a login frequency, an access timing pattern, a credential usage pattern, or a session management activity; and
correlating the one or more authentication actions with one or more of a user role, a geographic location, a device characteristic, or a network context to identify one or more security concerns, wherein the one or more security concerns are included in the threat profile.

16. The network computer of claim 11, wherein obtaining the one or more threat profiles further comprises:
obtaining one or more metrics that include one or more of a threat severity rating, a confidence score, a risk indicator, or an evidence correlation that are associated with the one or more evidence items, wherein the one or more threat profiles include the one or more metrics.

17. The network computer of claim 11, further comprising:
detecting one or more threats, wherein one or more descriptions of the one or more detected threats include one or more of evidence documentation, an attack vector description, a compromise indicator summary, or a threat actor attribution analysis;
obtaining one or more response recommendations associated with the one or more threats including one or more of an immediate containment measure, a threat mitigation strategy, a system hardening procedure, or an incident response escalation protocol; and
updating the report to include the one or more descriptions and the one or more response recommendations.

18. The network computer of claim 11, further comprising:
obtaining one or more other response recommendations including one or more of a complementary threat hunting plan, an expanded evidence collection activity, a related threat vector analysis, or a continuous monitoring requirement; and
collecting one or more detection rule proposals that incorporate one or more of a discovered threat indicator, an attack pattern, a behavioral anomaly, or a compromise signature into one or more automated monitoring systems; and
updating the report to include the one or more other response recommendations and the one or more detection rule proposals.

19. A processor readable non-transitory storage media that includes instructions configured for managing security in a computing environment, wherein execution of the instructions by one or more processors on one or more network computers performs actions, comprising:
obtaining a threat hunt plan to collect a plurality of candidate evidence items from one or more evidence sources;
discarding one or more portions of the plurality of candidate evidence items based on a relevance score associated with each candidate evidence item;
collecting one or more evidence items based on one or more non-discarded portions of the plurality of candidate evidence items;
identifying one or more threat indicators associated with the one or more evidence items based on one or more criteria in the threat hunt plan;
obtaining one or more threat profiles based on the one or more evidence items and the one or more threat indicators, wherein the one or more threat profiles include one or more threat assessment metrics associated with the one or more threat indicators, and wherein the one or more threat profiles are included in a report; and
obtaining a user interface that includes one or more display panels for content that includes the report and other information associated with the one or more threat assessments, wherein the content is dynamically transformed and arranged for display to a user based on one or more of user interaction telemetry, user feedback or telemetry metrics.

20. The media of claim 19, wherein collecting the one or more candidate evidence items, further comprises:
obtaining one or more collection agents to interface with one or more of a system log, a network traffic capture, an endpoint, a database, an email service, or a user activity record, wherein the one or more collection agents collect the plurality of candidate evidence items from the one or more evidence sources based on one or more of a time range, a filtering criterion, or a sampling rate.

* * * * *